(12) United States Patent
Sogoh et al.

(10) Patent No.: US 9,094,654 B2
(45) Date of Patent: Jul. 28, 2015

(54) ELECTRONIC APPARATUS

(75) Inventors: Chie Sogoh, Yokohama (JP); Akira Ohmura, Tokyo (JP)

(73) Assignee: NIKON CORPORATION, Tokyo (JP)

( * ) Notice: Subject to any disclaimer, the term of this patent is extended or adjusted under 35 U.S.C. 154(b) by 741 days.

(21) Appl. No.: 12/385,301

(22) Filed: Apr. 3, 2009

(65) Prior Publication Data

US 2009/0278973 A1 Nov. 12, 2009

Related U.S. Application Data

(63) Continuation of application No. PCT/JP2007/069497, filed on Oct. 4, 2007.

(30) Foreign Application Priority Data

| Oct. 4, 2006 | (JP) | 2006-273038 |
| May 9, 2007 | (JP) | 2007-124292 |

(51) Int. Cl.

| H04N 5/222 | (2006.01) |
| H04N 5/77 | (2006.01) |
| H04N 1/00 | (2006.01) |
| H04N 5/765 | (2006.01) |
| H04N 9/82 | (2006.01) |
| H04N 101/00 | (2006.01) |

(52) U.S. Cl.
CPC ........... *H04N 5/772* (2013.01); *H04N 1/00323* (2013.01); *H04N 5/765* (2013.01); *H04N 9/8205* (2013.01); *H04N 2101/00* (2013.01); *H04N 2201/3253* (2013.01); *H04N 2201/3273* (2013.01)

(58) Field of Classification Search
USPC .................................. 348/61, 333.01–333.09

IPC ...... H04N 1/00323,5/765, 2201/3273, 2101/00, H04N 2201/3253, 9/8205
See application file for complete search history.

(56) References Cited

U.S. PATENT DOCUMENTS

| 7,145,695 | B2 | 12/2006 | Endo et al. | |
| 7,831,917 | B1* | 11/2010 | Karam | 715/753 |
| 2002/0077750 | A1* | 6/2002 | McDonald et al. | 701/213 |
| 2005/0078174 | A1* | 4/2005 | Casey et al. | 348/61 |
| 2006/0078315 | A1 | 4/2006 | Wada et al. | |

(Continued)

FOREIGN PATENT DOCUMENTS

| EP | 1 128 285 A2 | 8/2001 |
| JP | A-2001-289650 | 10/2001 |
| JP | A-2002-191015 | 7/2002 |

(Continued)

OTHER PUBLICATIONS

European Search Report mailed on Apr. 6, 2010 in a corresponding foreign patent application.

(Continued)

*Primary Examiner* — Yogesh Aggarwal
(74) *Attorney, Agent, or Firm* — Oliff PLC

(57) ABSTRACT

An electronic apparatus includes: a display at which a photographic image and a map image are displayed; a display control unit that controls the display so as to display identifiers each indicating a specific photographing location at which the photographic image among a plurality of photographic images was captured, over the map image displayed at the display; and an instruction unit that issues an instruction indicating a display mode for the identifier.

17 Claims, 36 Drawing Sheets

(56) References Cited

U.S. PATENT DOCUMENTS

2006/0087503 A1\* 4/2006 Sasaki et al. .................. 345/211
2007/0255745 A1\* 11/2007 Gargi ............................ 707/102

FOREIGN PATENT DOCUMENTS

| JP | A-2002-366565 | 12/2002 |
| JP | A-2003-259340 | 9/2003 |
| JP | A-2003-288005 | 10/2003 |
| JP | A-2004-048560 | 2/2004 |
| JP | A-2004-120372 | 4/2004 |
| JP | A-2004-297339 | 10/2004 |
| JP | A-2006-020166 | 1/2006 |
| JP | A-2006-109410 | 4/2006 |
| JP | A-2006-126380 | 5/2006 |
| JP | A-2006-148514 | 6/2006 |
| JP | A-2006-157810 | 6/2006 |
| JP | A-2006-262134 | 9/2006 |

OTHER PUBLICATIONS

Jul. 19, 2011 Office Action issued in Japanese Patent Application No. 2007-124292 (with translation).

Jul. 5, 2011 Office Action issued in Japanese Patent Application No. 2006-273038 (with translation).

Jan. 31, 2012 Notification of Reasons for Refusal issued in Japanese Application No. 2007-124292 with English-language translation.

\* cited by examiner

ELECTRONIC APPARATUS

This application is a continuation of International Application No. PCT/JP2007/069497 filed Oct. 4, 2007.

INCORPORATION BY REFERENCE

The disclosures of the following applications are herein incorporated by reference:
Japanese Patent Application No. 2006-273038 filed Oct. 4, 2006
Japanese Patent Application No. 2007-124292 filed May 9, 2007
International Application No. PCT/JP2007/069497 filed Oct. 4, 2007.

BACKGROUND OF THE INVENTION

1. Field of the Invention

The present invention relates to an electronic device that enables display of a photographing location on a map image.

2. Description of Related Art

Japanese Laid-open Patent Publication No. 2006-148514 discloses a camera that executes photographing position measurement based upon a signal received from a GPS satellite. At the camera in the related art, the photographing location and the subject position are indicated on a map image.

SUMMARY OF THE INVENTION

There is an issue yet to be effectively addressed in the related art in that a plurality of photographing locations displayed in the same display mode cannot be distinguished from one another with ease.

An electronic apparatus according to the present invention comprises: a display at which a photographic image and a map image are displayed; a display control unit that controls the display so as to display identifiers each indicating a specific photographing location at which the photographic image among a plurality of photographic images was captured, over the map image displayed at the display; and an instruction unit that issues an instruction indicating a display mode for the identifier.

The instruction unit in the electronic apparatus can issue the instruction indicating the display mode in correspondence to a photographing date on which the photographic image was captured.

The instruction unit in the electronic apparatus can issue the instruction indicating the display mode in correspondence to device information indicating a device used to capture the photographic image.

It is preferable that the instruction unit in the electronic apparatus of the present invention issues the instruction indicating the display mode in correspondence to an operation signal output from an operation member. The instruction unit can issue the instruction indicating the display mode in correspondence to an operation signal output from the operation member while the map image is displayed at the display. Moreover, the instruction unit can issue the instruction indicating the display mode in correspondence to an operation signal output from the operation member while the photographic image is displayed at the display.

It is preferable that the instruction unit in the electronic apparatus described above selects one of an option for setting a common display mode for the identifiers in correspondence to all photographing locations and an option for not displaying the identifiers at any of the photographing locations.

The instruction unit of the electronic apparatus described above may select one of an option for displaying the identifiers only at specifically indicated photographing locations and an option for not displaying identifiers at specifically indicated photographing locations.

It is preferable that the instruction unit that issues the instruction indicating the display mode in correspondence to an operation signal output from an operation member sustains the display mode over a specific length of time. Moreover, the instruction unit can adjust the specific length of time based upon the operation signal output from the operation member.

In the electronic apparatus described above, the identifiers assume a display mode that allows the identifiers to indicate photographing directions; and the instruction unit can determine orientations of the identifiers in correspondence to the photographing directions in which photographs were taken at the photographing locations. In this case, it is preferable that when the map image is displayed at the display with a display scale equal to or greater than a predetermined value, the instruction unit allows use of the identifiers assuming the display mode that enables the identifiers to indicate the photographing directions.

DESCRIPTION OF PREFERRED EMBODIMENTS

The following is an explanation of the best mode for carrying out the present invention, given in reference to the drawings.

(First Embodiment)

Figure 1:
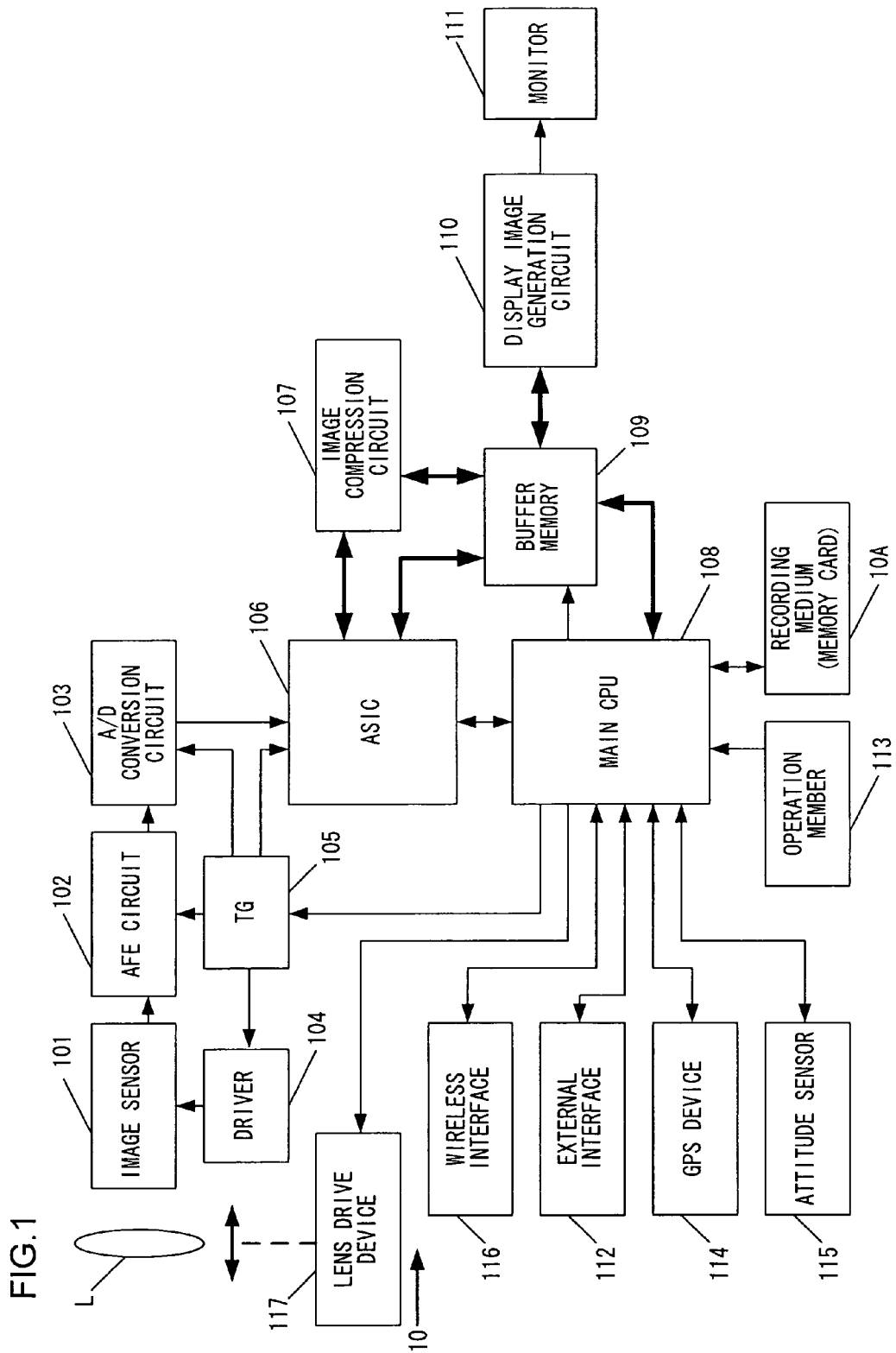
FIG. 1 is a block diagram of the essential structure assumed in the electronic camera achieved in an embodiment of the present invention.

FIG. 1 is a block diagram of the essential structure adopted in an electronic camera 10 achieved in the first embodiment of the present invention. A timing generator (TG) 105 in FIG. 1 provides timing signals to a driver 104, an AFE (analog front end) circuit 102, an A/D conversion circuit 103 and an image processing circuit 106 in response to an instruction output from a main CPU 108. The driver 104 provides a drive signal for an image sensor 101.

A photographic lens L forms a subject image on an imaging surface of the image sensor 101. The image sensor 101, which may be constituted with a CCD image sensor or the like equipped with a plurality of photoelectric conversion elements each corresponding to a pixel, captures the subject image formed on the imaging surface and outputs photoelectric conversion signals corresponding to the brightness of the subject image. R (red), G (green) and B (blue) color filters are disposed at the imaging surface of the image sensor 101 so as to assume positions each corresponding to a specific pixel position. The photoelectric conversion signals output from the image sensor 101, which captures the subject image through the color filters, contain color information expressed in the RGB calorimetric system.

The AFE circuit 102 executes analog processing (such as gain control) on the photoelectric conversion signals output from the image sensor 101. The A/D conversion circuit 103 converts the imaging signals having undergone analog processing to digital signals.

The main CPU 108 executes specific arithmetic operations by using signals input thereto from various blocks and outputs control signals generated based upon the arithmetic operation results to the individual blocks. The image processing circuit 106, which may be constituted as an ASIC, executes image processing on the digital image signals input thereto from the A/D conversion circuit 103. The image processing executed by the image processing circuit includes, for instance, outline emphasis processing, color temperature adjustment (white balance adjustment) processing and format conversion processing executed to convert the image signal format.

An image compression circuit 107 executes image compression processing on the image signals having undergone the processing at the image processing circuit 106 so as to compress the image at a predetermined compression ratio in the JPEG format. A display image generation circuit 110 creates display data to be used to display the captured image at a liquid crystal monitor 111. At the liquid crystal monitor 111, a reproduced image expressed by display data input from the display image generation circuit 110 is displayed. In addition to the image display data, the display image generation circuit 110 creates data used to display messages, menus and marks. Thus, information other than images is also displayed at the liquid crystal monitor 111.

A recording medium 10A is constituted with a memory card or the like that can be detachably loaded into/unloaded from the electronic camera 10. In response to an instruction issued by the main CPU 108, and image file containing photographic image data and the corresponding photographing information is recorded into the recording medium 10A. In addition, map data are recorded into the recording medium 10A in response to an instruction from the main CPU 108. Image files and map data having been recorded in the recording medium 10A can be individually read out in response to an instruction issued by the main CPU 108.

A buffer memory 109 is used as a work memory where data are temporarily stored while the image processing is in progress as well as prior to and following the image processing, an image file yet to be recorded into the recording medium 10A is stored, an image file read out from the recording medium 10A is stored and a map image is generated by using map data.

An operation member 113, which includes a shutter release button, a menu switch, a dial and a confirm (OK) switch at the electronic camera 10, outputs to the main CPU 108 an operation signal corresponding to a depression operation or a rotation operation of a specific switch. A lens drive device 117 executes focus adjustment via a photographic lens L by driving the focus lens constituting part of the photographic lens L forward/backward along the optical axis in response to an instruction from the main CPU 18.

In response to an instruction provided by the main CPU 108, a wireless interface 116 exchanges data with an external device through, for instance, wireless LAN communication, infrared communication or optical fiber communication. An external interface 112 exchanges data with an external device (such as a personal computer or a cradle) via a cable (not shown) in response to an instruction provided by the main CPU 108.

A GPS device 114 receives a radio wave from a GPS satellite in response to an instruction from the main CPU 108 and outputs a reception signal to the main CPU 108. The main CPU 108, in turn, executes a specific arithmetic operation based upon the reception signal provided by the GPS device 114 and detects position information (latitude, longitude and altitude) indicating the position of the electronic camera 10.

An attitude sensor 115 detects the attitude of the electronic camera 10 in response to an instruction provided by the main CPU 108 and outputs a detection signal to the main CPU 108. Based upon the attitude detection signal, the main CPU 108 is able to determine the orientation in which the electronic camera 10 is held, i.e., whether the electronic camera 10 is held upright or sideways.

The electronic camera 10 described above assumes a structure that enables it to execute specific types of image processing and compression processing on the image signals obtained at the image sensor 101 through a photographing operation and generate an image file containing image data resulting from the compression processing and additional information that includes the position information, mark type information to be detailed later and information related to the photographic image. More specifically, the electronic camera 10 creates an Exif image file by storing the JPEG image data in an image data portion and storing the additional information in an additional information portion of the image file. The image file thus generated is saved in the recording medium 10A.

Since the embodiment is characterized by the reproduction operation executed in the electronic camera 10 to display information at the liquid crystal monitor 111 by using the image file, the following description focuses on displays that may be brought up at the liquid crystal monitor 111.

Figure 2:
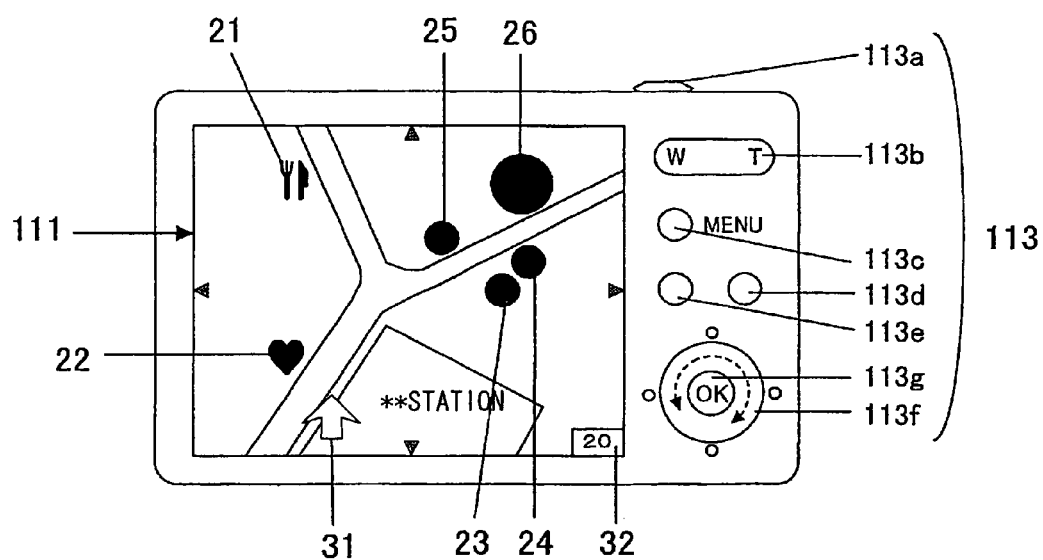
FIG. 2 is a view of the rear of the electronic camera.

FIG. 2 presents a view of the electronic camera 10 taken from the side where the liquid crystal monitor 111 is disposed (camera rear side). As shown in FIG. 2, the liquid crystal monitor 111 is disposed at the rear side of the electronic camera 10 with a zoom switch 113b, a menu switch 113c, other operation switches 113d, 113e, 113g and a dial 113f disposed to one side of the liquid crystal monitor 111. The dial 113f, assuming a ring shape, generates a rotation operation signal in response to a rotation thereof and a pressure position signal in response to a depression thereof. An OK switch 113g is disposed at the center of the dial 113f. In addition, a shutter release button 113a is disposed at the top surface of the electronic camera 10.

FIG. 2 shows a map image displayed at the liquid crystal monitor 111. It is to be noted that as a map information display setting is selected and then the operation mode is switched to the reproduction mode, a map image such as that shown in FIG. 2 is brought up on display. The electronic camera 10 displays a map of the area corresponding to a specific option selected in a menu screen from, for instance, the following five options.
1) a map of the area around the current position of the electronic camera 10 (the position calculated based upon the reception signal provided from the GPS device 114)
2) the area map having been up on display at the liquid crystal monitor 111 most recently (previously)
3) a map of the area around the position determined (calculated based upon the reception signal from the GPS device 114) during the most recent (previous) photographing operation
4) a map of a preselected area
5) a map of the area indicated in an operation signal provided from the operation member 113

The electronic camera 10 achieved in the embodiment is able to receive map information needed to display the map image from an external device via the wireless interface 116 or the external interface 112. The map data received from the external device are recorded into the recording medium 10A.

The display image up at the liquid crystal monitor 111 in the example presented in FIG. 2 includes marks 21~26, a pointer 31 and a frame number indicator 32 superimposed over the map image. The marks 21~26 are identifiers, each indicating that the electronic camera 10 holds an image having been photographed at the position corresponding to the particular mark. In more specific terms, position information is saved in correspondence to the positions at which the marks 21~26 are to be displayed, and the electronic camera 10 displays a mark at the position (photographing position) on the map image, indicated by a specific set of position information, in correspondence to an image file recorded in the recording medium 10A.

The mark to be displayed at each photographing position is selected from a plurality of mark types assuming different shapes or colors that may include a regular circular mark, a restaurant mark 21 and a heart mark 22. The electronic camera 10 reads out information indicating a specific mark type recorded in the recording medium 10 in relation to a given photographic image and displays the mark of the particular type indicated in the information thus read out, over the map image on display at the liquid crystal monitor 111.

The mark display is controlled so that its size is adjusted in correspondence to the number of images having been photographed at the position corresponding to the mark. The electronic camera 10 displays a large mark when, for instance, a plurality of neighboring marks would overlap or the number of images having been photographed at a single position is large.

The display range (i.e., the map scale) of the map image displayed at the liquid crystal monitor 111 is adjusted based upon an operation signal output from the zoom switch 113b. The electronic camera 10 executes display control so as to raise the scale (for an enlarged display) as the zoom switch 113b is operated toward the telephoto side (T) and lower the scale (for a reduced display) as the zoom switch 113b is operated toward the wide-angle side (W).

If neighboring marks can be shown as individual marks in a map image with a greater scale (in an enlarged map image), the electronic camera 10 displays a plurality of smaller marks separate from one another in the enlarged display, in place of the single large mark having been on display previously.

The display of the pointer 31 is controlled so as to allow it to move freely within the display screen of the liquid crystal monitor 111. In correspondence to a pressure position signal output from the dial 113f, the electronic camera 10 displaces the pointer 31 in a smooth movement in the direction indicated by the pressure position. For instance, if the dial 113f is pressed on its right side, the pointer 31 is caused to move further to the right relative to the current display position. If the right side of the dial 113f is pressed and held, the pointer keeps moving to the right. If the right side of the dial 113f is still being held down when the pointer 31 reaches the right side of the display screen, the electronic camera scrolls the map image on display toward the left (to the right in FIG. 2). As a result, the portion of the map image over the right side area, which was not previously on display, is scrolled into the display area at the liquid crystal monitor 111.

The electronic camera 10 executes similar display control when the dial 113f is pressed on its upper side, its left side or its lower side. It is to be noted that if the dial 113f is pressed on a diagonal, the electronic camera 10 executes display control so as to scroll the map image along the corresponding direction.

The electronic camera 10 also displaces the pointer 31 in response to a rotation of the dial 113f. In response to a rotation of the dial, the pointer 31 is caused to move directly to (straight to) a mark on display at the liquid crystal monitor 111. For instance, if the dial 113f is rotated to the right, the electronic camera 10 moves the pointer 31 directly to the closest mark from the current display position. If the dial 113f is continuously rotated to the right, the electronic camera 10 moves the pointer 31 directly to the closest mark to the right from the current display position. If the dial 113f is rotated to the left, the electronic camera 10 moves the pointer 31 to the closest mark to the left from the current display position. It is to be noted that control may be executed so as to move the pointer 31 from the current display position to another mark in the order in which images corresponding to individual marks indicating various photographing locations were photographed based upon a menu setting operation. In such a case, the electronic camera 10 should move the pointer 31 onto a mark indicating the photographing location at which a later image was photographed in response to a rotation of the dial 113f to the right, and move the pointer 31 onto a mark indicating the photographing location at which an earlier image was photographed in response to a rotation of the dial 113f to the left.

Figure 3:
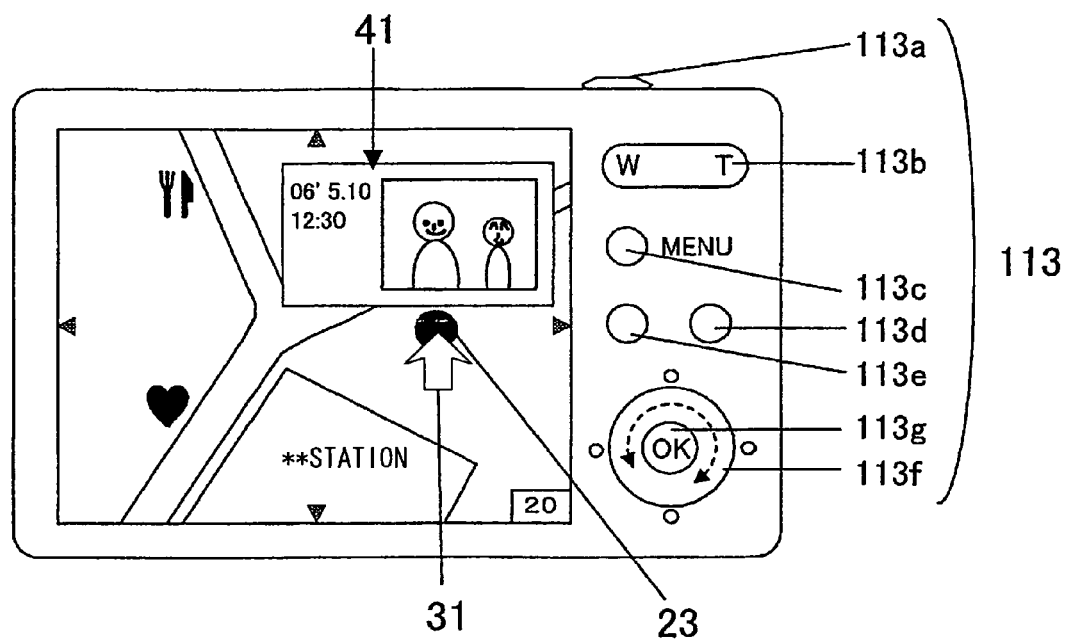
FIG. 3 presents an example of an image that may be brought up on display at the liquid crystal monitor.

If the pointer 31 is placed over a given mark continuously over a predetermined length of time (e.g., 0.5 sec), the electronic camera 10 reads out from the recording medium 10A the thumbnail image of an image having been photographed at the position corresponding to the mark and displays the thumbnail image at the liquid crystal monitor 111. FIG. 3 presents an example of a display image that may be brought up at the liquid crystal monitor 111 under such circumstances. FIG. 3 shows the pointer 31 placed over the mark 23 and the thumbnail image and the photographing date superimposed over the map image at a position at which the thumbnail image and the photographing date do not hide the mark 23 and the pointer 31.

If the OK switch 113g is pressed while the thumbnail image 41 is on display, the electronic camera 10 brings up on display a full-size display by increasing the display size of the thumbnail image 41 so as to display the image over the entire display range of the liquid crystal monitor 111 (full screen display). If the zoom switch 113b is pressed while the full screen display is up, the electronic camera 10 reverts to the thumbnail image display (see FIG. 3) having been up prior to the full screen display.

Figure 4:
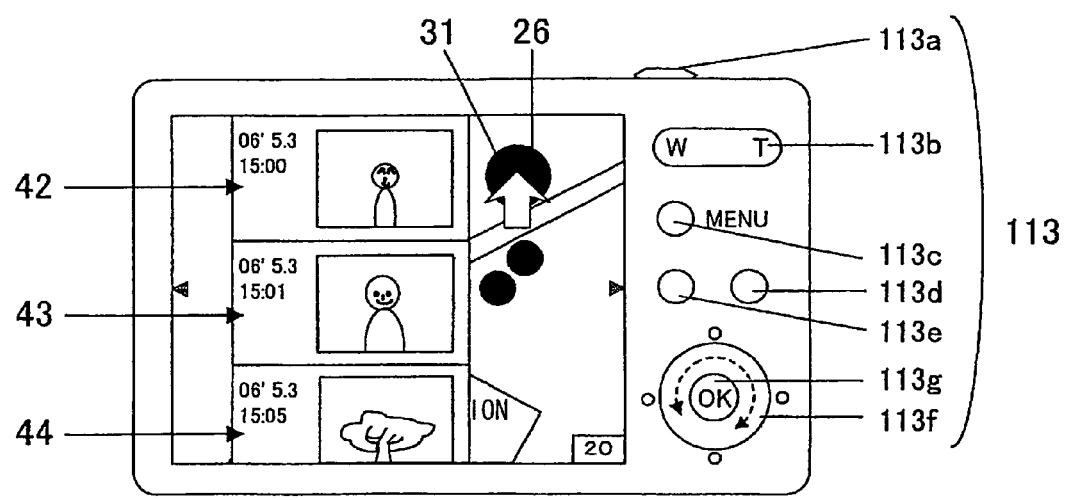
FIG. 4 presents an example of an image that may be brought up on display at the liquid crystal monitor.

If the pointer 31 is placed over a large mark (indicating a large number of images having been photographed at the corresponding position) continuously over a predetermined length of time, the electronic camera 10 individually reads out from the recording medium 10A the plurality of thumbnail images of the images having been photographed at the position corresponding to the mark and displays the thumbnail images at the liquid crystal monitor 111. FIG. 4 presents an example of a display image that may be brought up at the liquid crystal monitor 111 under such circumstances. FIG. 4 shows the pointer 31 placed over the mark 26 and a plurality of thumbnail images 42~44 and the corresponding photographing dates, superimposed over the map image at a position at which the thumbnail images and the photographing dates do not hide the mark 26 and the pointer 31.

If the OK switch 113g is pressed while the plurality of thumbnail images 42~44 are on display, the electronic camera 10 selects a specific thumbnail image, e.g., the thumbnail image 42, and displays it in a mode different from the mode assumed for the display of the other thumbnail images. In the different display mode, the photographing date display area corresponding to the selected image may assume a color different from that of the photographing date display areas corresponding to the other images or the selected thumbnail image may be displayed in color while displaying the other thumbnail images in grayscale.

In response to the pressure position signal provided from the dial 113f, the electronic camera 10 smoothly shifts the position indicating the selected thumbnail image among the plurality of thumbnail images along the up/down direction. For instance, if the dial 113f is pressed on its lower side, the electronic camera 10 moves the selection position downward. If the lower side of the dial 113f is held down, the electronic camera 10 moves the selection position further downward. If the lower side of the dial 113f is still being held down when the selection position reaches the lower end side (the thumbnail image 44 in FIG. 4) of the display screen, the electronic camera 10 scrolls the thumbnail image display upward. As a result, a thumbnail image that has not been on display previously among the thumbnail images of the images having been photographed at the particular position is scrolled into the display area at the liquid crystal monitor 111 and this new thumbnail image is selected.

If the OK switch 113g is pressed while a specific thumbnail image is selected, the electronic camera 10 brings up on display a full-size display by increasing the display size of the thumbnail image so as to display the image over the entire display range of the liquid crystal monitor 111 (full screen display). If the zoom switch 113b is pressed while the full screen display is up, the electronic camera 10 reverts to the thumbnail image display having been up prior to the full screen display. In this situation, the selection position remains effective.

If the zoom switch 113b is operated again, the electronic camera 10 determines that none of the listed thumbnail images has been selected and reverts to the thumbnail image display in FIG. 4. As a result, the pressure position signal output from the dial 113f is detected as a displacement instruction for the pointer 31 again.

(Reproduction Mode Processing)

Figure 5:
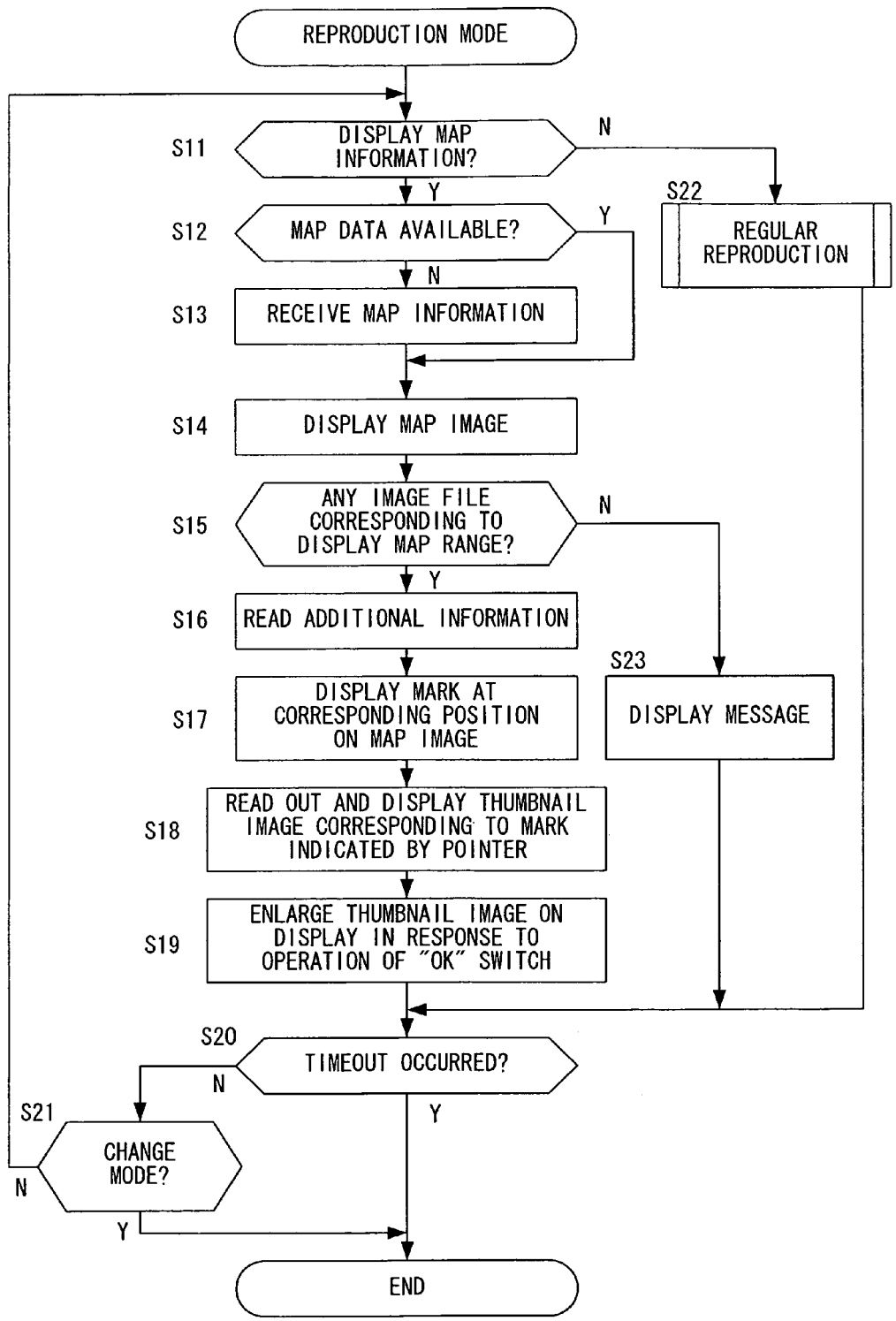
FIG. 5 presents a flowchart of the reproduction mode processing executed by the main CPU.

FIG. 5 presents a flowchart of the reproduction mode processing executed by the main CPU 108 in the electronic camera 10. The program based upon which the processing in FIG. 5 is executed is stored in an internal memory (not shown) of the main CPU 108 and is started up as the electronic camera 10 receives an instruction for shifting into the reproduction mode. The instruction for switching to the reproduction mode may be issued via, for instance, the mode selector switch 113e constituting part of the operation member 113.

In step S11 in FIG. 5, a decision is made as to whether or not to display map information. If a map information display instruction has been issued in a menu setting screen, an affirmative decision is made in step S11 and the operation proceeds to step S12, whereas if a map information display instruction has not been issued by selecting the corresponding menu setting, a negative decision is made in step S11 and the operation proceeds to step S22.

In step S12, a decision is made as to whether or not the required map data are present in the electronic camera. If the map data for the display target area are stored in the recording medium 10A, an affirmative decision is made in step S12 and the operation proceeds to step S14. In step S14, the map information needed to display the map image is read out from the recording medium 10A. If the map data for the display target area are not stored in the recording medium 10A, a negative decision is made in step S12 and the operation proceeds to step S13. It is to be noted that the map display target area will having been specified via a menu screen.

In step S13, an instruction is output to the wireless interface 116 or the external interface 112 to receive the map information needed to display the map image, originating from the external device, at the interface and then the operation proceeds to step S14.

In step S14, an instruction is transmitted to the display image generation circuit 110 and a map image over a specific range is brought up on display at the liquid crystal monitor 111 based upon the map information before the operation proceeds to step S15. In step S15, a decision is made as to whether or not any image file containing an image having been photographed at the photographing position corresponding to a specific position within the display map range at the liquid crystal monitor 111 is recorded in the recording medium 10A. If an image having been photographed within the display map range is present in the electronic camera 10, an affirmative decision is made in step S15 and the operation proceeds to step S16. However, if the electronic camera 10 does not hold any image having been photographed within the display map range, a negative decision is made in step S15 and the operation proceeds to step S20.

In step S16, the additional information contained in the image file of the image having been photographed within the display map range is read out from the recording medium 10A, and then the operation proceeds to step S17. In step S17, a mark is brought up on display at the corresponding position in the map image, as shown in FIG. 2, before the operation proceeds to step S18. The main CPU 108 also displays the pointer and the frame number indicator.

If the pointer is placed over a mark, a thumbnail image corresponding to the particular mark is read out from the recording medium 10A and the thumbnail image thus read out is brought up on display over the map image (see FIG. 3) in step S18. The operation then proceeds to step S19.

If the "OK" switch 113g is pressed while the thumbnail image display is up, the display size of the thumbnail image is increased and the enlarged image is displayed over the entire screen (see FIG. 7) at the liquid crystal monitor 111 in step S19, and then the operation proceeds to step S20.

In step S20, a decision is made as to whether or not a timeout has occurred. An affirmative decision is made in step S20 if no operation signal from the operation member 113 is input over a predetermined length of time and, in this case, the processing in FIG. 5 ends. If an operation signal from the operation member is input or if the condition in which no operation signal is input is not sustained over the predetermined length of time, a negative decision is made in step S20 and the operation proceeds to step S21.

In step S21, a decision is made as to whether or not a mode switch operation has been performed to switch from the reproduction mode to a photographing mode. If an operation signal indicating a mode switch has been input from the mode selector switch 113e, an affirmative decision is made in step S21 and the processing shown in FIG. 5 ends. However, if no operation signal indicating a mode switch is input from the mode selector switch 113e, a negative decision is made in step S21 and the operation returns to step S11.

If a negative decision is made in step S11, the operation proceeds to step S22 to execute the regular reproduction/display processing, which does not include display of the map image. Then the operation proceeds to step S20. In the regular reproduced image display, the image in the frame indicated in the pressure position signal originating from the dial 113f is displayed over the entire display range of the liquid crystal monitor 111 (full screen display). For instance, a rightward operation signal from the dial 113f may indicate a forward frame seek, whereas a leftward operation signal from the dial 113f may indicate a backward frame seek. In addition, the electronic camera assumes a structure that enables it to switch between the full screen display providing the display of a single frame image and a multiple frame display that provides a side-by-side display of thumbnail images corresponding to a plurality of frames (e.g., four frames).

In step S23, to which the operation proceeds upon making a negative decision in step S15, an instruction is output to the display image generation circuit 110 to display the following message overlaid on the map image. Namely, the main CPU 108 may display a message "no image photographed in this map range" at the liquid crystal monitor 111, before the operation proceeds to step S20.

(Photographing Mode Processing)

Figure 6:
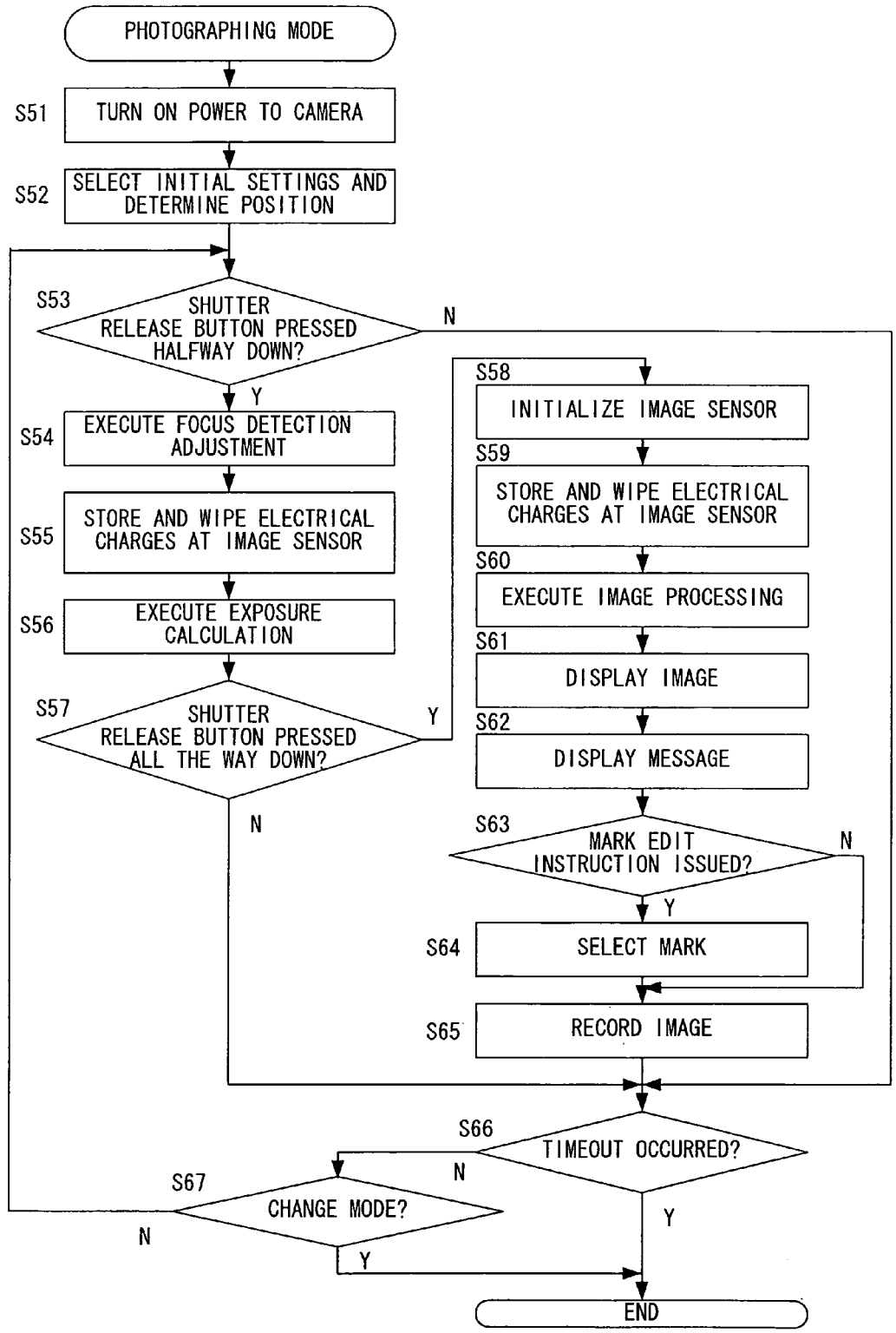
FIG. 6 presents a flowchart of the photographing mode processing executed by the main CPU.

The photographing mode processing is now described in detail in reference to the flowchart presented in FIG. 6. The program based upon which the processing in FIG. 6 is executed is stored in an internal memory (not shown) of the main CPU 108 and is started up as the electronic camera 10 receives an instruction for shifting into the photographing mode. The instruction for switching to the photographing mode is issued via, for instance, the mode selector switch 113e.

In step S51 in FIG. 6, power supply to the block (the image sensor 101, the driver 104 and the like) constituting the imaging unit starts, and then the operation proceeds to step S52. In step S52, the initial settings are selected and the current position of the electronic camera is determined before the operation proceeds to step S53. The default photographing mode, the default display, the default image processing and the like are set as the initial settings. The main CPU 108 obtains the position information via the reception signal provided by the GPS device 114 and ascertains the current position of the electronic camera.

In step S53, a decision is made as to whether or not the shutter release button 113a has been pressed halfway down. If a halfway press operation signal has been input, an affirmative decision is made in step S53 to proceed to step S54, whereas if no halfway press operation signal has been input, a negative decision is made in step S53 and the operation proceeds to step S66.

In step S54, an instruction is provided to a focus detection device (not shown) and the lens drive device 117 to engage them in detection of the focusing condition achieved via the lens L and focus adjustment and then the operation proceeds to step S55. In step S55, an imaging operation is started at the image sensor 101 (electrical charge storage is started). Once a predetermined length of time has elapsed, the main CPU 108 ends the imaging operation and executes control so as to wipe the stored electrical charges from the image sensor 101.

In step S56, exposure calculation is executed by using the image signals from the image sensor 101 and then the operation proceeds to step S57. In step S57, a decision is made as to whether or not the shutter release button 113a has been pressed all the way down. An affirmative decision is made in step S57 if a full press operation signal has been input and, in this case, the operation proceeds to step S58. However, if no full press operation signal has been input, a negative decision is made in step S57 and the operation proceeds to step S66.

In step S58, the image sensor 101 is initialized (all superfluous charges are wiped) before the operation proceeds to step S59. In step S59, a main imaging operation is started at the image sensor 101 (electrical charge storage is started). The main CPU 108 executes drive control for the shutter (not shown) and aperture (not shown) based upon the control exposure value determined in step S56 and once the control shutter time has elapsed, it ends the imaging operation and wipes the stored electrical charges from the image sensor 101.

In step S60, an instruction is output to the image processing circuit 106 to engage the image processing circuit in a specific type of image processing on the image signals from the image sensor 101, and then the operation proceeds to step S61. In step S61, an instruction is output to the display image generation circuit 110 to engage the display image generation circuit in the creation of display data based upon the digital image signals resulting from the image processing. The operation then proceeds to step S62. Consequently, a reproduced photographic image is brought up on display at the liquid crystal monitor 111.

In step S62, an instruction is output to the display image generation circuit 110 to display the following message overlaid on the reproduced photographic image currently on display. Namely, the main CPU 108 displays a message such as "edit mark?" at the liquid crystal monitor 111 over a predetermined length of time and then the operation proceeds to step S63.

An affirmative decision is made in step S63 if a mark edit instruction has been issued and, in this case, the operation proceeds to step S64. However, if no mark edit instruction has been issued, a negative decision is made in step S63 and the operation proceeds to step S65. The main CPU 108 may judge that a mark edit instruction is issued if the "OK" switch 113g is pressed while the message is up on display and judge that no mark edit instruction is issued if the "OK" switch 113g is not pressed while the message is up on display.

In step S64, mark selection processing is executed. In more specific terms, the main CPU 108 transmits an instruction for the display image generation circuit 110 to bring up a display of a mark list of a plurality of pre-registered marks superimposed over the photographic image. The main CPU 108 smoothly shifts the selection position in the mark list along the up/down direction in response to a pressure position signal provided from the dial 113f. For instance, if the dial 113f is pressed on its lower side, the main CPU 108 shifts the selection position downward whereas if the dial 113f is pressed on its upper side, the main CPU shifts the selection position upward. As the "OK" switch 113g is pressed, the selection of the currently specified mark is confirmed before the operation proceeds to step S65. The mark list display ends if the operation is to proceed to step S65.

In step S65, the image file in the buffer memory 109 is recorded into the recording medium 10A and then the operation proceeds to step S66. The image file contains the additional information, including the position information and the mark information, together with the image data. It is to be noted that if a negative decision is made in step S63, the standard circular mark is automatically selected by the main CPU 108.

In step S66, a decision is made as to whether or not a timeout has occurred. An affirmative decision is made in step S66 if no halfway press operation signal is input over a predetermined length of time and, in this case, the power supply to the block constituting the imaging unit is turned off before the processing in FIG. 6 ends. However, a negative decision is made in step S66 if a halfway press operation signal is input or if the conditions in which no halfway press operating signal is input is not sustained over the predetermined length of time and the operation proceeds to step S67.

In step S67, a decision is made as to whether or not a mode switch operation has been performed. If an operation signal indicating a mode switch has been input from the mode selector switch 113e, an affirmative decision is made in step S67 and the processing in FIG. 6 ends. If, on the other hand, no operation signal indicating a mode switch has been input from the mode selector switch 113e, a negative decision is made in step S67 and the operation returns to step S53.

The following advantages are achieved through the embodiment described above.

(1) If a plurality of image files containing images having been photographed at a plurality of locations displayed in a single screen display at the liquid crystal monitor 111 are recorded in the recording medium 10A loaded in the electronic camera 10, marks 21~26, for instance, are displayed, each in correspondence to one of the photographing positions. As a result, the user is able to ascertain the photographing positions at which the plurality of images were photographed in the map on display without having to switch the map display.

(2) The electronic camera 10 further displays the frame number indicator 32 over the map image on display at the liquid crystal monitor 111. As a result, the user is able to verify the number of photographic images having been photographed within the map range on display without having to count the number of marks.

(3) The electronic camera 10 also displays a movable pointer 31 over the map image on display at the liquid crystal monitor 111. Then, as the pointer 31 is placed over one of the marks 21~26, the electronic camera 10 displays the thumbnail image of each image having been photographed at the photographing location corresponding to the particular position on the map image indicated by the pointer 31. Thus, the user is able to check the photographic image with ease on the map image on display.

(4) If the OK switch 113g is pressed while the thumbnail image is on display, the electronic camera 10 displays the thumbnail image in the full screen display at the liquid crystal monitor 111. As a result, the user is easily able to scrutinize in detail the image related to the thumbnail.

(5) The electronic camera 10 displays a mark selected for each photographing position from a plurality of types of marks assuming different shapes or colors, including the restaurant mark 21 and the heart mark 22 as well as the regular circular mark. Thus, the user is able to recognize the image having been photographed at a given photographing location based upon the type of mark displayed at the position on the map corresponding to the photographing location.

(6) The electronic camera 10 adjusts the size of the mark in correspondence to the number of images having been photographed at the position corresponding to the mark. Consequently, the user is able to as certain the number of images having been photographed at a specific photographing location based upon the size of the mark displayed on the map image.

(7) The electronic camera 10 allows the pointer 31 to directly move from one mark to another among the marks 21~26. Thus, the user is able to check the thumbnail images corresponding to the individual marks quickly in the map image display.

(Variation 1)

A description is given above by assuming that a single large mark is displayed to represent a plurality of neighboring marks that would overlap one another. However, if different types of marks overlap one another, a single type of mark may be displayed. In such a case, priority rankings among the individual marks will be determined in advance and if two marks, for instance, cannot be displayed separately, the main CPU 108 will display the mark with higher priority.

(Variation 2)

An explanation is given above on an example in which if a plurality of image files containing images having been photographed at a plurality of locations indicated in a given screen display at the liquid crystal monitor 111, are recorded in the recording medium 10A loaded in the electronic camera 10, marks 21~26 are displayed in correspondence to all the image files. Instead, only a mark that is designated in advance as a display-allowed mark may be selectively displayed. For instance, a display-allow setting may be switched on/off for each type of mark, such as the restaurant mark, via a menu screen. Variation 2 allows only marks that the user wishes to display to be brought up on display.

(Variation 3)

The display of a specific type of mark may be prohibited in advance so as to ensure that the particular type of mark is never displayed. For instance, a display-disallow setting may be switched on/off for each type of mark, such as the heart mark, via a menu screen. Variation 3 allows only the mark the user does not wish to display to be suspended from display.

(Variation 4)

The display allow setting in variation 2 or the display-disallow setting in variation 3 may be sustained only over a predetermined length of time. For instance, display control may be executed so as to display a mark in correspondence to which a one-month display allow setting is selected until the one-month time limit has passed and suspend the mark from display once the one-month period has elapsed. Such a time limit may be set in correspondence to each mark via a menu screen together with the display allow setting or the display-disallow setting.

(Variation 5)

In addition to the different types of marks, "favorite" information may be registered. In such a case, the mark information should contain a flag indicating whether or not the corresponding image has been registered as a favorite in addition to the information indicating the mark selected through the mark selection processing. Image files can be individually registered as favorites via a menu screen. At the setting for displaying only the marks selected for the images having been selected as favorites, the main CPU 108 selectively displays on the map only the marks selected for the images having been registered as favorites regardless of their mark types. Variation 5 makes it possible to display only the marks selected in correspondence to the user's favorite images.

(Variation 6)

The circular mark automatically selected by the main CPU 108 upon making a negative decision in step at 63 (see FIG. 6) may assume different colors or forms in correspondence to different dates. In this case, marks assuming different modes or formations will be displayed for different photographing dates to provide the user with a clear display without having to execute the mark selection processing. In addition, marks assuming different modes may be used in correspondence to different electronic cameras 10 used to capture images. For instance, a mark preregistered in a setting menu may be used in correspondence to each electronic camera.

(Variation 7)

While an explanation is given above on an example in which the switchover between the photographing mode and the reproduction mode is effected in response to an operation signal provided from the mode selector switch 113e, the photographing mode may instead be selected in response to a halfway press operation of the shutter release button 113a performed in the reproduction mode. In such a case, the main CPU 108 will exit the reproduction mode and enter the photographing mode in response to the halfway press operation signal input thereto as the shutter release button 113a is pressed halfway down. More specifically, the operation will proceed to step S51 in FIG. 6 to execute the photographing mode processing and once the photographing mode processing has ended, the reproduction mode will be started up. It is desirable that if the shutter release button 113a is not pressed all the way down after the operation shifts into the photographing mode, the operation automatically revert to the reproduction mode upon judging that a timeout has occurred (upon making an affirmative decision in step S66). In addition, it is desirable that the operation automatically revert to the reproduction mode upon recording the image (step S65) If photographing processing is executed in response to a full press operation at the shutter release button 113a after the operation shifts into the photographing mode. The structure adopted in variation 7 allows the electronic camera to ready itself for photographing operation quickly even while the map image is up on display.

(Variation 8)

The image frame on full screen display (see FIG. 7) in step S19 may be changed forward or backward in response to a pressure position signal provided from the dial 113f so as to display a preceding image or a succeeding image. For instance, the rightward operation signal from the dial 113f may indicate a forward image seek and the leftward operation signal from the dial may indicate a reverse image seek. In addition, if the zoom switch 113b is pressed while the full screen display is up, the main CPU 108 may bring up a map image display indicating the photographing location at which the image currently displayed in the full screen display was photographed.

In more specific terms, the main CPU 108 reads the additional information in the image file containing the image up in the full screen display so as to obtain the position information indicating the position at which the image was photographed and the mark information. The main CPU 108 then outputs an instruction for the display image generation circuit 110 to display at the liquid crystal monitor 111 a map image over a specific range that includes the position (photographing position) indicated in the position information and also display the mark indicating the photographing position. The structure achieved in variation 8 allows a specific image to be brought up in full screen display to be selected first and then the map image such as that shown in FIG. 2, containing the image photographing position, to be displayed. It is to be noted that the marks indicating other photographing positions, the pointer and the frame number indicator are displayed as shown in FIG. 2.

(Variation 9)

When the pointer 31 is positioned over one of marks 21~26 on the map image, the electronic camera 10 described above displays a thumbnail of the image having been photographed at the photographing location corresponding to the position indicated by the pointer 31 and then, as the OK switch 113g is pressed while the thumbnail is up on display, the electronic camera brings up the image corresponding to the thumbnail as a full-screen display at the liquid crystal monitor 111. As an alternative, the image corresponding to the thumbnail may be brought up in a full-screen display as soon as the pointer 31 is set over one of the marks 21~26. In this case, the user is able to check the image corresponding to the thumbnail with ease.

(Variation 10)

The orientation of the map image displayed at the liquid crystal monitor 111 may be adjusted based upon the detection information provided by the attitude sensor 115. In such a case, the main CPU 108 should adjust the orientation of the map image brought up on display at the liquid crystal monitor 111 in correspondence to the attitude (the horizontal or vertical orientation) of the electronic camera 10 by outputting an instruction to the display image generation circuit 110. By adopting variation 9, the map image can be displayed with the optimal orientation to ensure that the user is able to view the map image with ease regardless of the orientation of the electronic camera 10.

(Variation 11)

While an explanation is given above on an example in which the electronic device according to the present invention is embodied as the electronic camera 10, the present invention may instead be adopted in a portable telephone equipped with a camera, a PDA unit equipped with a camera or an image viewing device (viewer) at which images photographed with a camera or the like can be viewed.

(Second Embodiment)

The second embodiment of the present invention is now described. The following explanation focuses on the difference from the first embodiment, with the same reference numerals assigned to components identical to those in the first embodiment, to preclude the necessity for a repeated explanation. In other words, unless a given component is particularly noted, it is identical to the corresponding component in the first embodiment. The second embodiment enables adjustment of the display magnification factor at which the reproduced image is displayed.

Figure 7:
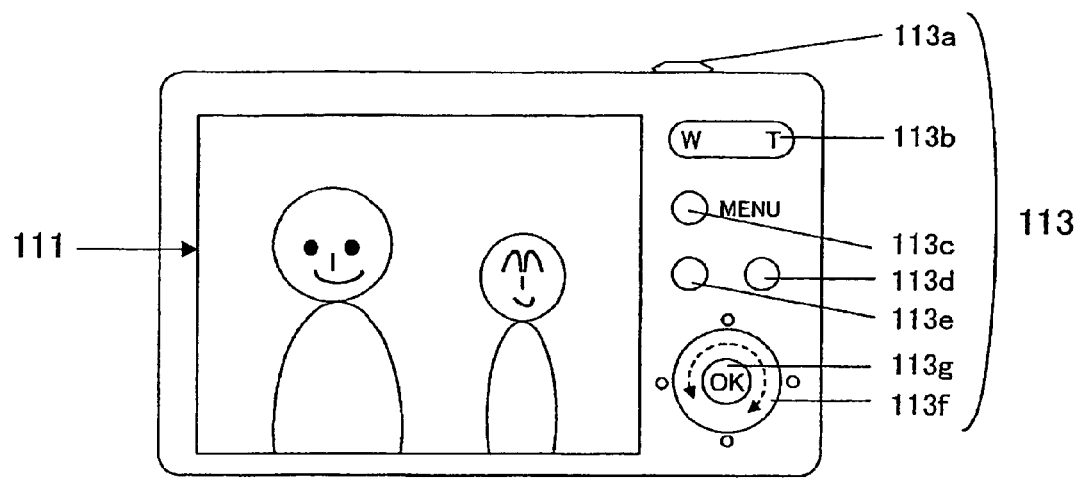
FIG. 7 presents an example of an image that may be brought up on display (in a full screen display) at the liquid crystal monitor.

FIG. 7 presents an example of an image that may be brought up on display at the liquid crystal monitor 111 through the processing executed in step S19 (see FIG. 5). The main CPU 108 may switch the display contents as described below. Namely, as the switch 113d is operated while the full-screen display of a reproduced image is up at the liquid crystal monitor 111, the main CPU 108 switches from the full screen display in FIG. 7 back to the thumbnail display superimposed over the map image, as shown in FIG. 3.

Figure 8:
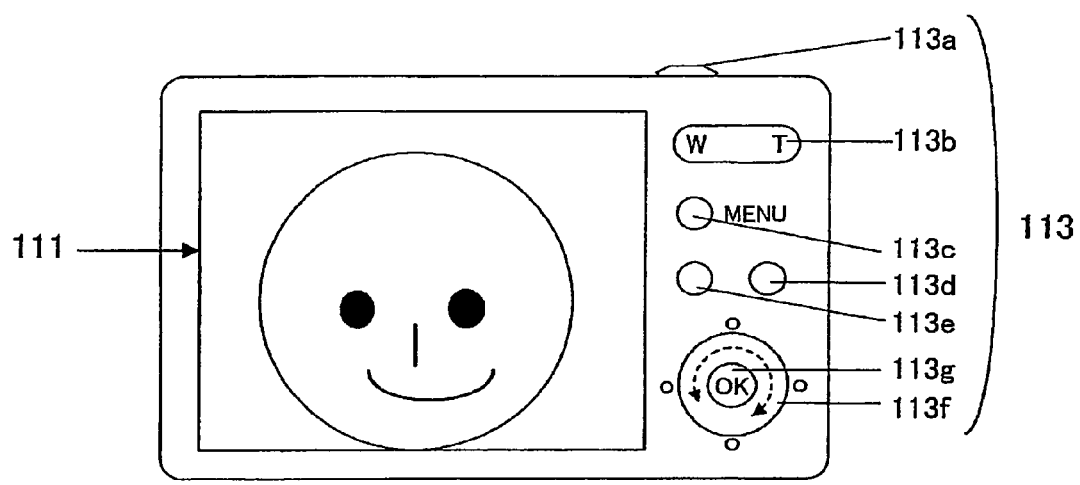
FIG. 8 presents an example of an image that may be provided in a zoom-in display (in a full screen display)

If the zoom switch 113b is operated while the full-screen display of the reproduced image is up at the liquid crystal monitor 111, the main CPU 108 adjusts the display magnification factor (electronic zoom magnification factor) for the reproduced image in the full-screen display based upon the zoom operation signal. FIG. 8 presents an example of a zoom-in reproduced image (in the full-screen display) displayed as the zoom switch 113b is operated along the zoom-in direction (to the T side). If the zoom switch 113b is operated along the zoom-out direction (toward the W side) while the reproduced image in FIG. 8 is up on display, the main CPU 108 zooms down the display magnification factor (electronic zoom magnification factor) for the reproduced image in correspondence to the zoom operation signal.

Figure 9:
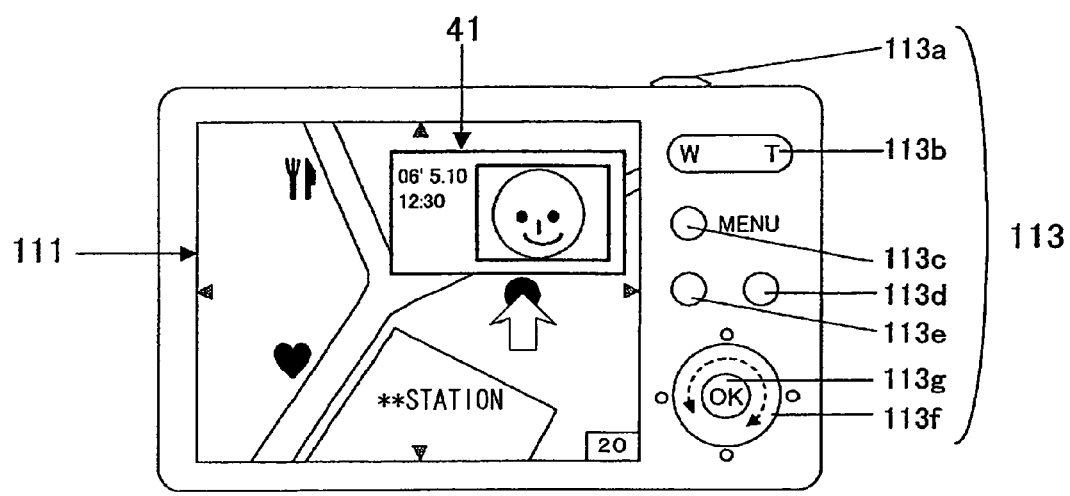
FIG. 9 presents an example of an image that may be provided in a zoom-in display (in a thumbnail display)

If the zoom switch 113b is operated while a thumbnail display of a reproduced image is superimposed over the map image (a "picture-in-picture" display such as that shown in FIG. 3), the main CPU 108 adjusts the display magnification factor (electronic zoom magnification factor) for the reproduced image in the thumbnail display based upon the zoom operation signal. FIG. 9 presents an example of a zoom-in reproduced image (in the thumbnail display) displayed as the zoom switch 113b is operated along the zoom-in direction (to the T side). If the zoom switch 113b is operated along the zoom-out direction (toward the W side) while the thumbnail image in FIG. 9 is up on display, the main CPU 108 zooms down the display magnification factor (electronic zoom magnification factor) for the thumbnail image in correspondence to the zoom operation signal.

Figure 10:
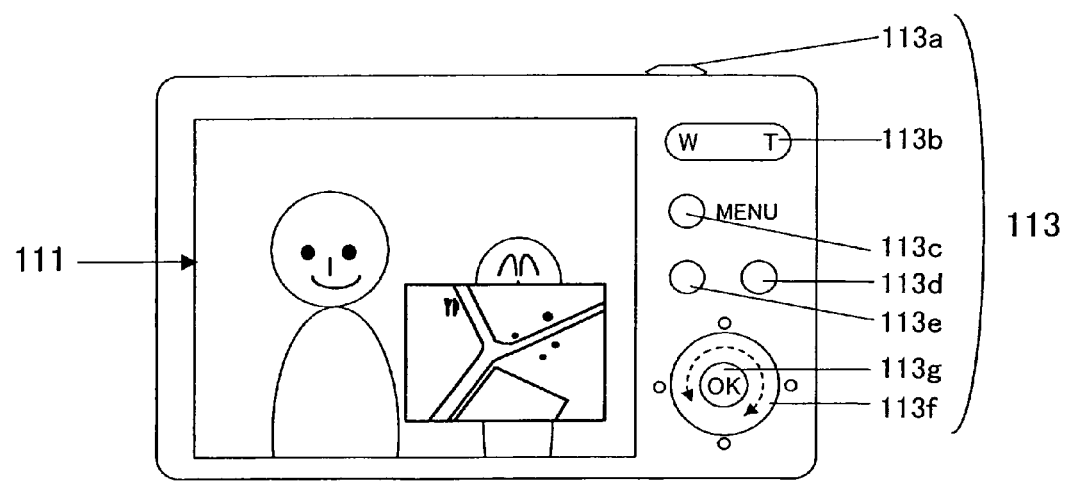
FIG. 10 presents an example of a reduced map image display that may be superimposed over a reproduced image.

If the switch 113d is operated while the thumbnail display of the reproduced image is superimposed over the map image, the main CPU 108 displays a reduced map image over the reproduced image (e.g., the "picture-in-picture" display in FIG. 10). In other words, the main CPU 108 reverses the background/foreground relationship between the reproduced image and the map image. If the zoom switch 113b is operated while the picture-in-picture in FIG. 10 is up, the main CPU 108 adjusts the scale of the map image in the reduced display in correspondence to the zoom operation signal.

It is to be noted that the forward image seek or the reverse image seek for the reproduced image display is executed in response to a pressure position signal output from the dial 113f as in variation 8. Namely, the rightward operation signal from the dial 113f indicates the forward image seek whereas the leftward operation signal from the dial 113f indicates the reverse image seek. The forward image seek and the reverse image seek are executed by targeting all the image files recorded in the recording medium 10A. However, an alternative structure that designates, based upon a menu setting operation, only image files attached with a specific type of mark indicating their photographing locations or only image files containing position information as targets of the forward image seek and the reverse image seek may be adopted.

The second embodiment described above enables adjustment of the display magnification factor (electronic zoom magnification factor) of the reproduced image either in the full-screen display at the liquid crystal monitor 111 (see FIG. 7) or in the thumbnail display superimposed over the map image (see FIG. 3).

In addition, the display magnification factor (electronic zoom magnification factor) of a superimposed thumbnail image in a picture-in-picture display or the scale of a superimposed map image in a picture-in-picture display can be adjusted based upon the zoom operation signal.

Furthermore, the display mode in which a thumbnail image is displayed over a map image can be switched to the display mode in which a reduced map image is superimposed over a reproduced image and vice versa in response to an operation signal provided from the switch 113b. Thus, whichever image the user wishes to see in detail can be displayed over the greater range.

(Third Embodiment)

The third embodiment of the present invention is now described. The following explanation focuses on the difference from the first and second embodiments, with the same reference numerals assigned to components identical to those in the first and second embodiments, to preclude the necessity for a repeated explanation. In other words, unless a given component is particularly noted, it is identical to the corresponding component in the first and second embodiments. In reference to the third embodiment, the concepts of variations 2, 3 and 4 are described in further detail.

Figure 11:
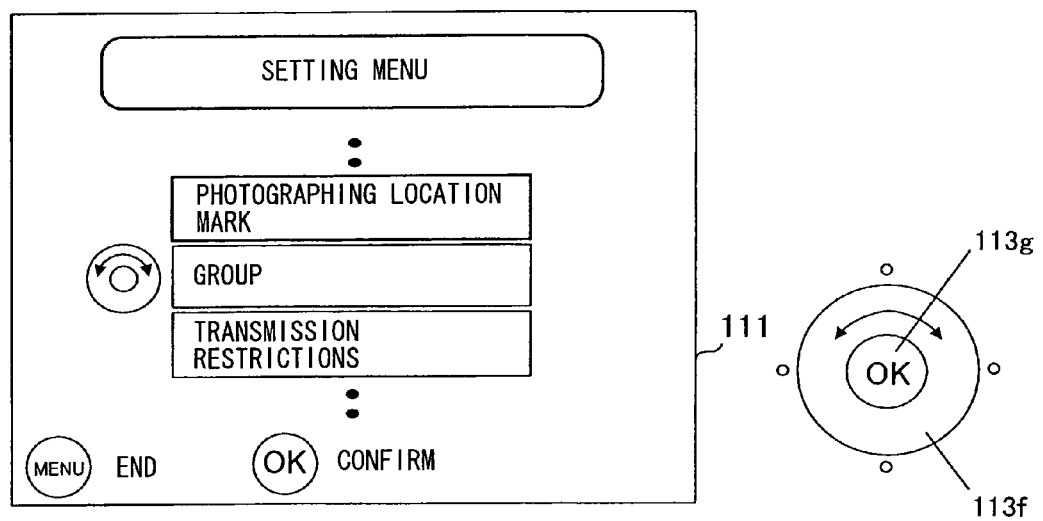
FIG. 11 presents an example of a setting menu screen.

FIG. 11 presents an example of a setting menu screen that may be brought upon display at the liquid crystal monitor 11 by the main CPU 108 in response to an operation of the menu switch 113c. In response to a rotation operation signal output from the dial 113f, the main CPU 108 switches the selected option and as the OK switch 113g is operated, the main CPU displays at the liquid crystal monitor 111 a menu screen related to the currently selected option.

(Photographing Location Mark)

Figure 12:
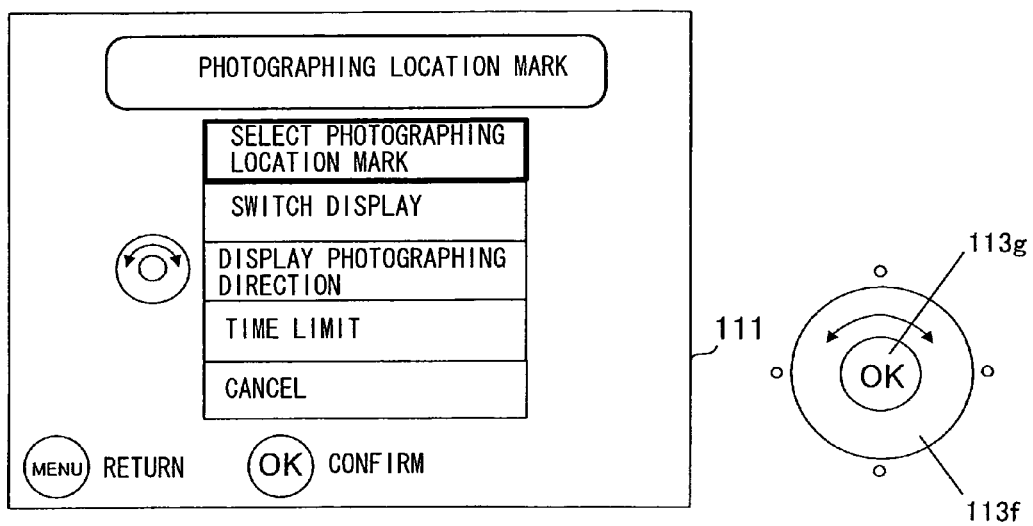
FIG. 12 presents an example of a menu screen.

Any photographing location mark selected in the photographing mode (see FIG. 6) can be subsequently changed through a menu setting operation. FIG. 12 presents an example of a menu screen that may be brought up on display to enable setting operations related to a mark used to indicate a photographing location. If the OK switch 113g is operated while the option "select photographing location mark" among the options listed in FIG. 12 is selected, the main CPU 108 brings up on display at the liquid crystal monitor 111 the menu screen shown in FIG. 13. In the embodiment, a photographing location mark assuming a specific shape or color can be selected in reference to an image having been photographed at the particular photographing location or on a map in which the photographing location mark is to be displayed, or a common photographing location mark can be selected for all the images.

Figure 13:
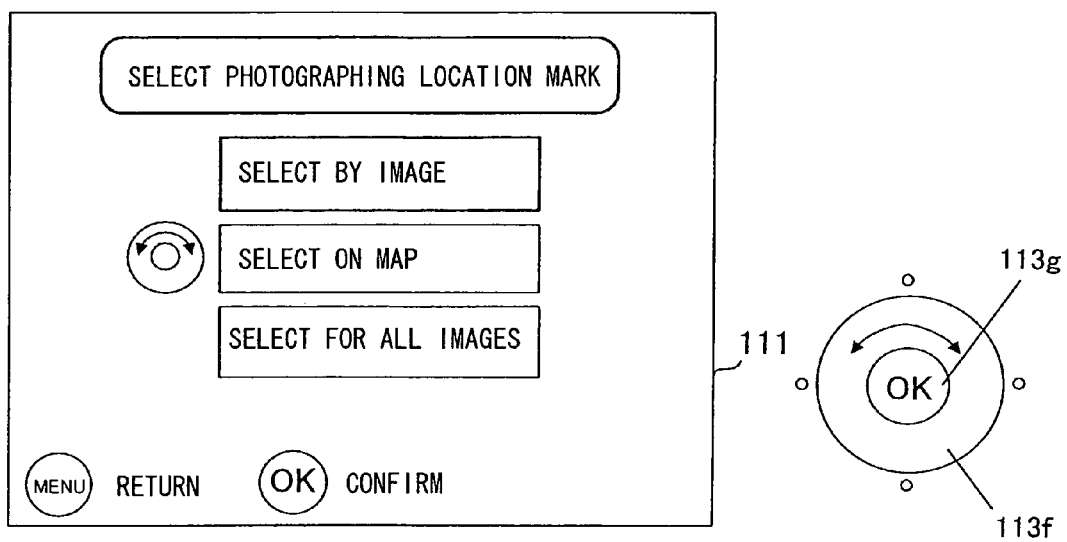
FIG. 13 presents an example of a menu screen.
Figure 14:
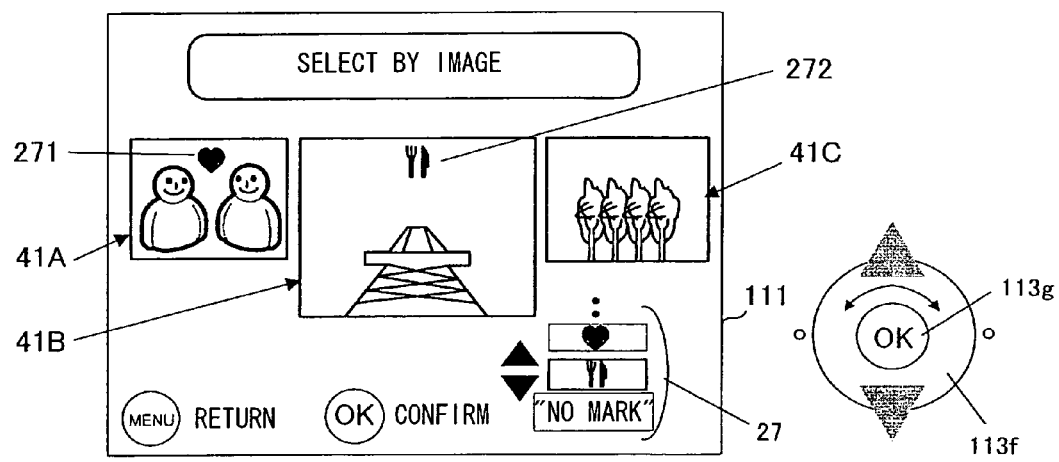
FIG. 14 presents an example of an operation screen.

FIG. 14 presents an example of an operation screen that may be displayed when selecting photographing location mark types in correspondence to individual images. As the OK switch 113g is operated after the option "select by image" among the options listed in FIG. 13, is selected, the CPU 108 displays the operation screen in FIG. 14 at the liquid crystal monitor 111.

FIG. 14 shows thumbnail images 41A~41C of the images in the image files recorded in the recording medium 10A, displayed side-by-side at the liquid crystal monitor 111. The main CPU 108 displays different thumbnail images and switches the selection target image among the thumbnail images on display in response to rotation operation signals output from the dial 113f. In the example presented in FIG. 14, the thumbnail image 41B displayed at the center of the screen in a larger size has been selected. The main CPU 108 scrolls thumbnail images to the left/right in response to a rotation operation signal from the dial 113f. Namely, as the dial 113f is rotated, a forward/backward image seek operation is performed. When selecting the photographing location mark "by image", the main CPU 108 designates the mark indicating the photographing location of the selected image 41B as the target.

In addition to the thumbnail images, the main CPU 108 displays a photographing location mark list 27 listing a plurality of photographing location marks assuming different shapes or colors. The main CPU 108 selects a specific mark in the mark list 27 based upon an upward/downward operation signal input from the dial 113*f*, and as the OK switch 113*g* is subsequently operated, the main CPU designates the currently selected mark as a mark 272 used to indicate the photographing location of the selected image 41B. It is to be noted that the mark list 27 includes an option "no mark", which may be selected when the user wishes to display no photographing location mark. Information indicating the selected (altered) photographing location mark 272 is recorded in the mark information stored in the image file containing the selected image 41B.

Figure 15:
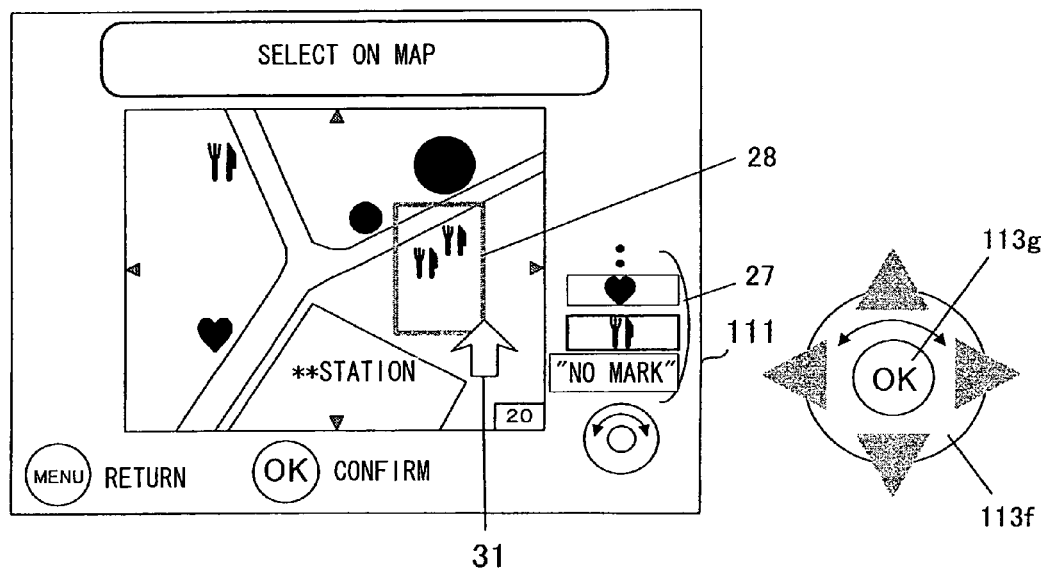
FIG. 15 presents an example of an operation screen.

FIG. 15 presents an example of an operation screen that may be displayed when selecting photographing location mark types on the map. As the OK switch 113*g* is operated after the option "select on map" among the options listed in FIG. 13 is selected, the CPU 108 displays the operation screen in FIG. 15 at the liquid crystal monitor 111.

FIG. 15 shows a map image similar to the map image in FIG. 2, with photographing location marks displayed over the map image. The photographing location marks are displayed to indicate the photographing locations where images among the image files recorded in the recording medium 10A were photographed in the area corresponding to the map range on display. In addition to the map image, a photographing location mark list 27 listing a plurality of photographing location marks assuming different shapes or colors is displayed.

The main CPU 108 displays a quadrangle 28 indicated by the pointer 31. For instance, the quadrangle 28 displayed by the main CPU may be a rectangle one diagonal point of which is assumed at the position at which the pointer 31 is displayed when the switch 113*d* is pressed and the other diagonal point of which is assumed at the position at which the pointer 31 is displayed when the switch 113*d* is released. When selecting photographing location marks "on map", the main CPU 108 selects a mark to be used to indicate a photographing location within the quadrangle 28.

The main CPU 108 selects a specific mark from the mark list 27 based upon a rotation operation signal output from the dial 113*f* and as the OK switch 113*g* is subsequently operated, it designates the currently selected mark as the mark to be used to indicate the photographing location within the quadrangle 28. As has been described in reference to the option "select by image", the mark list 27 includes the option "no mark" selected when the user wishes to display no photographing location mark and the information indicating the selected (altered) photographing location mark is recorded as the mark information stored in the corresponding image file.

Figure 16:
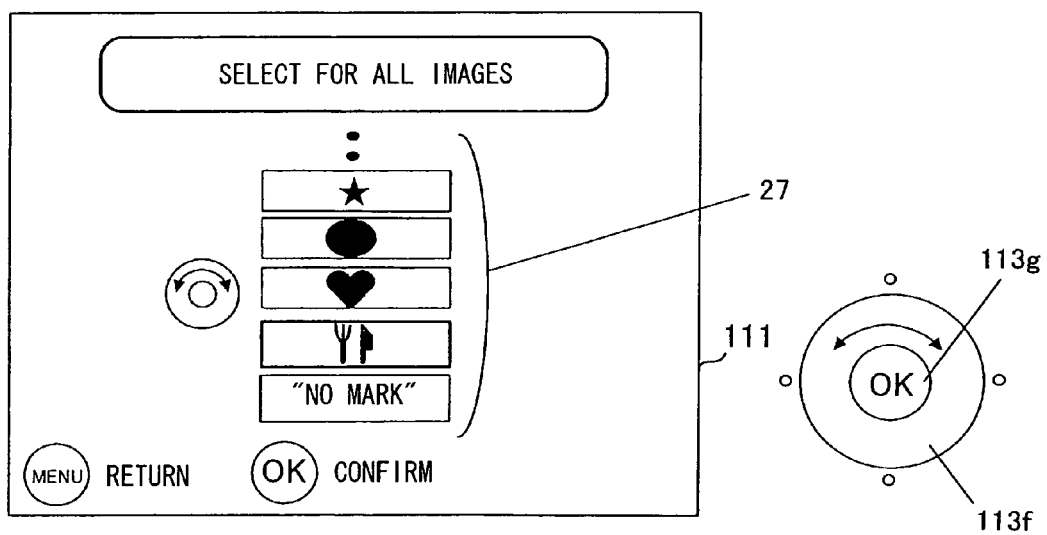
FIG. 16 presents an example of an operation screen.

FIG. 16 presents an example of an operation screen that may be displayed when selecting a common photographing location mark for all the images. As the OK switch 113*g* is operated after the option "select for all images" among the options listed in FIG. 13 is selected, the CPU 108 displays the operation screen in FIG. 16 at the liquid crystal monitor 111.

FIG. 16 shows a photographing location mark list 27, listing a plurality of photographing location marks assuming different shapes or colors on display. The main CPU 108 switches to a specific mark in the mark list 27 based upon a rotation operation signal from the dial 113*f*. As the OK switch 113*g* is subsequently operated, the main CPU 108 designates the currently selected mark as the common mark for all the image files. When selecting a common photographing location mark "for all images" the main CPU 108 designates the marks indicating the photographing locations of all the image files recorded in the recording medium 10A in a batch as batch substitute targets.

As has been described earlier, the mark list 27 includes the option "no mark" selected when the user wishes to display no photographing location mark and the information indicating the selected (altered) photographing location mark is recorded as the mark information stored in the corresponding image files.

(Switching Photographing Location Mark Display)

Figure 17:
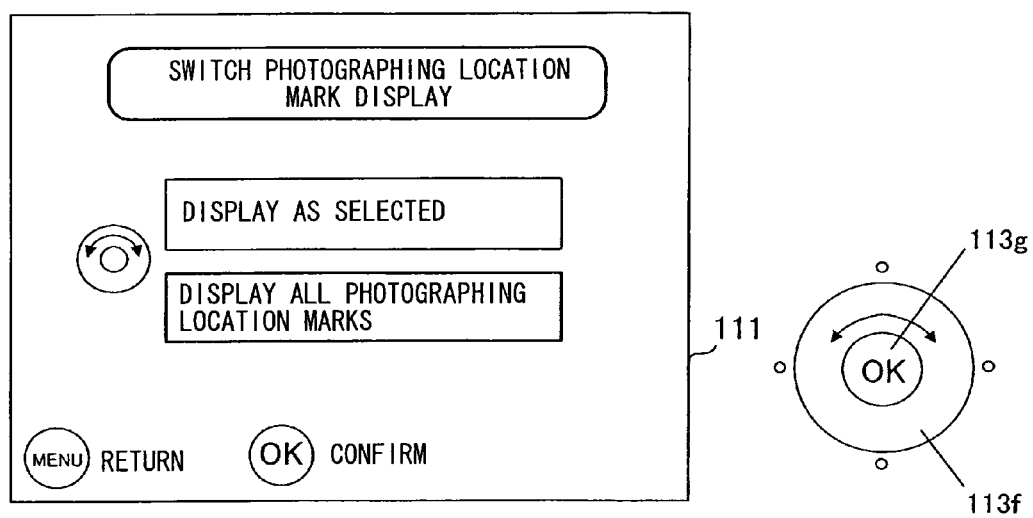
FIG. 17 presents an example of a menu screen.

As the OK switch 113*g* is operated after the option "switch display" among the options listed in FIG. 12 is selected, the main CPU 108 brings up on display at the liquid crystal monitor 111 a menu screen such as that shown in FIG. 17. The main CPU 108 switches to a different option in response to a rotation operation signal output from the dial 113*f*. Then, as the OK switch 113*g* is operated, the main CPU 108 selects the internal settings for the photographing location mark display in correspondence to the currently selected option.

If the option "display as selected" is selected, the main CPU 108 displays the photographing location marks having been set (altered) through the processing executed in the embodiment over the map image based upon the internal settings. If "no mark" has been selected for a given photographing location, no photographing location mark is displayed. If the option "display all photographing location marks" is selected, the main CPU 108 displays the photographing location marks having been set (altered) through the processing executed in the embodiment over the map image and also displays a default mark (e.g., a regular circular mark) at each photographing location for which the "no mark" option has been selected.

(Displaying Directional Photographing Location Marks)

Figure 18:
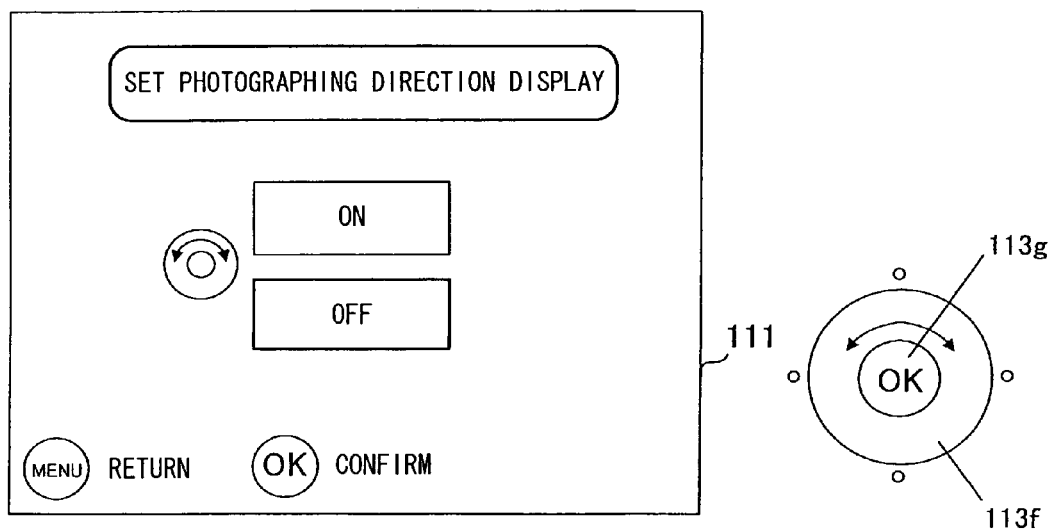
FIG. 18 presents an example of a menu screen.

As the OK switch 113*g* is operated after the option "display photographing direction" among the options listed in FIG. 12 is selected, the main CPU 108 brings up on display at the liquid crystal monitor 111 a menu screen such as that shown in FIG. 18. The main CPU 108 switches to a different option in response to a rotation operation signal output from the dial 113*f*. Then, as the OK switch 113*g* is operated, the main CPU 108 selects a specific internal setting determining whether or not to indicate the photographing directions based upon the currently selected option.

Figure 19:
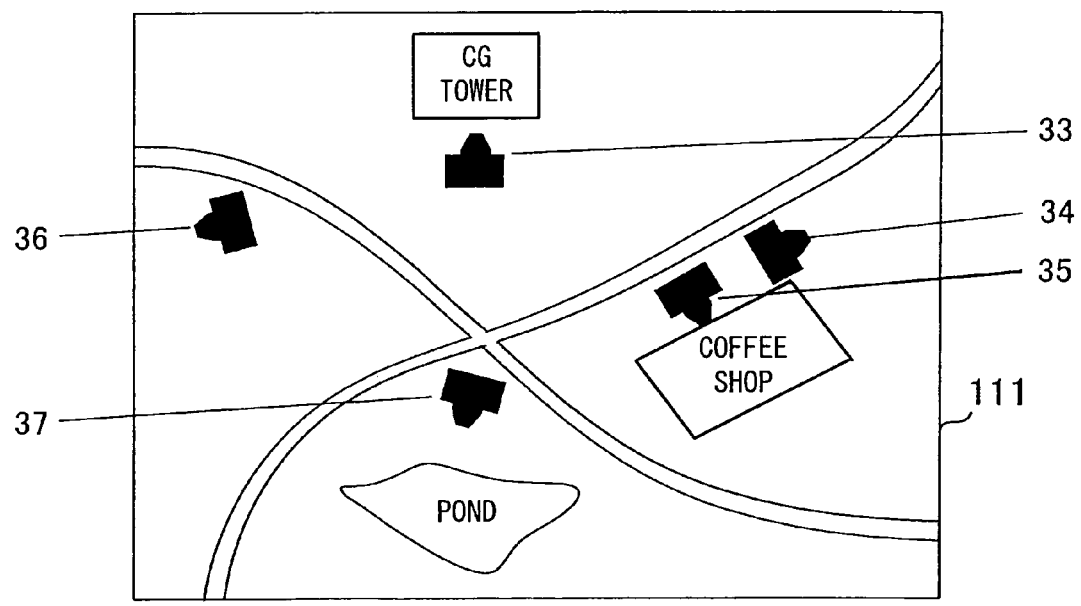
FIG. 19 presents an example of a map image with photographing location marks each assuming specific directionality displayed thereupon.

If the photographing direction display is "on", the main CPU 108 displays marks, each assuming a shape indicating a specific direction, over the map image in place of the photographing location marks having been set (altered) through the processing executed in the embodiment based upon the internal setting. FIG. 19 presents an example of a map image with directional photographing location marks 33~37 displayed therein. For instance, the photographing location mark 33 indicates that the image was photographed with a camera turned toward the CG tower. If the photographing direction display is "off", the main CPU 108 displays the photographing location marks having been set (altered) through the processing executed in the embodiment over the map image.

It is desirable that when the photographing direction display is on, the photographing location marks 33~37 with directionality be displayed only if the scale of the map image is greater than a predetermined value. In other words, it is not likely to be useful to indicate the photographing directions in a map image in a wide area display, i.e., a small scale, in which a subject such as a building, i.e., an extremely small entity relative to the map display range, will not show clearly.

(Setting Time Limit for Photographing Location Mark Setting)

Figure 20:
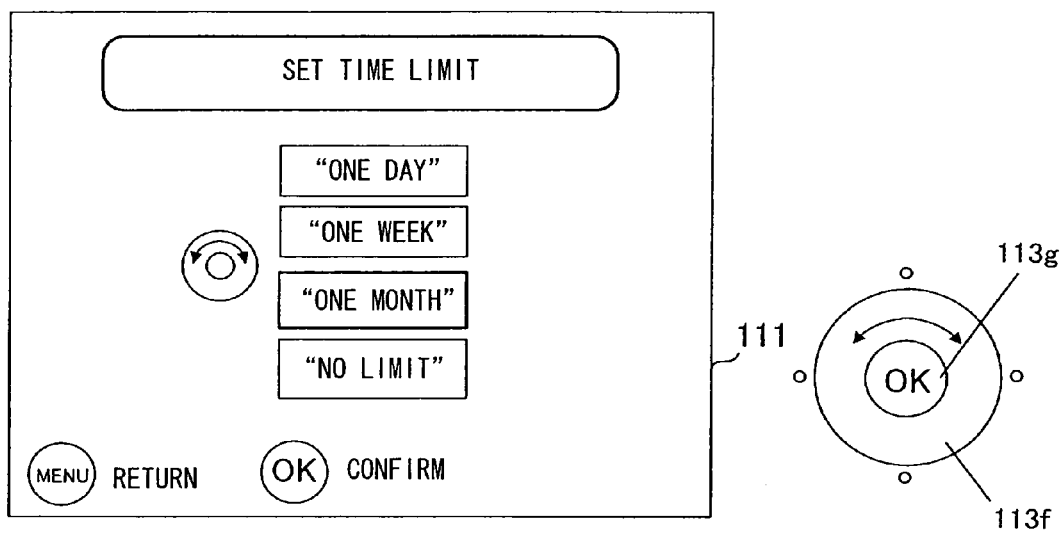
FIG. 20 presents an example of a menu screen.

As the OK switch 113g is operated after the option "time limit" among the options listed in FIG. 12 is selected, the main CPU 108 brings up on display at the liquid crystal monitor 111 a menu screen such as that shown in FIG. 20. The main CPU 108 switches to a different option in response to a rotation operation signal output from the dial 113f. Then, as the OK switch 113g is operated, the main CPU 108 selects a specific internal setting with respect to the time limit for the photographing location mark settings based upon the currently selected option.

If "one day" is selected for the time limit, the main CPU 108 sets the duration over which the setting details related to the photographing location marks having been set (altered) through the processing executed in the embodiment are to be held (saved in a non-volatile memory (not shown)) to one day based upon the internal setting. The holding period starts at a point in time at which the OK switch 113g is operated to set a time limit or a point in time at which an operation is executed to change a photographing location mark. Once the holding period has elapsed, the main CPU 108 erases the setting details selected for the photographing location marks and the photographing location marks are each invariably switched to the default mark (e.g., a standard circular mark).

If "one week" or "one month" is selected for the time limit, the main CPU 108 sets the duration over which the setting details having been selected (altered) through the processing executed in the embodiment are held (saved in the non-volatile memory (not shown)) to one week or one month. As described above, the holding period starts at the point in time at which the operation is performed to set the time limit or a point in time at which an operation is performed to change a photographing location mark.

If "no limit" is selected for the time limit, the main CPU 108 holds (saves in the non-volatile memory (not shown)) the setting details related to the photographing location marks having been selected (altered) through the processing executed in the embodiment indefinitely.

(Canceling Photographing Mark Settings)

Figure 21:
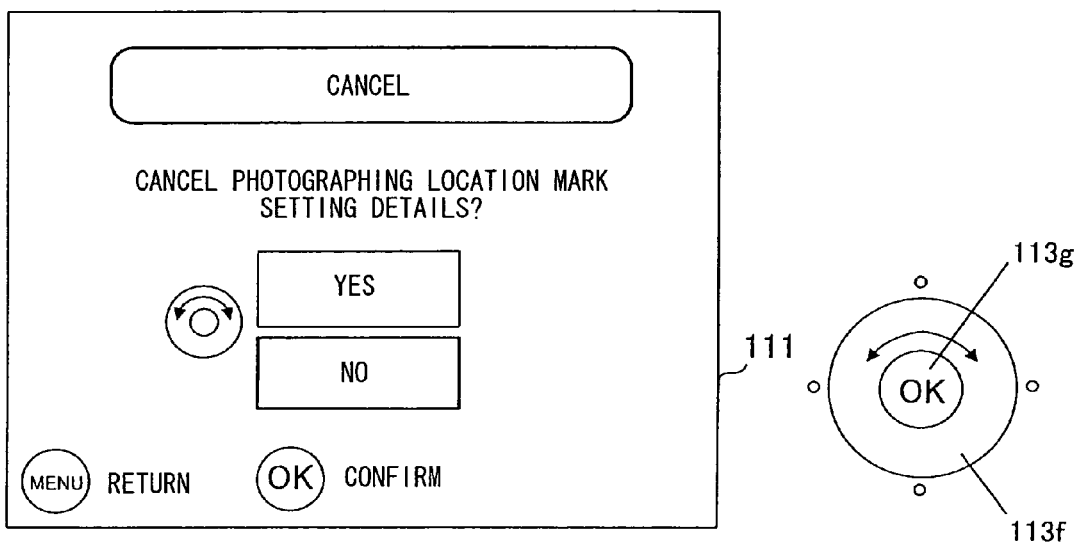
FIG. 21 presents an example of a menu screen.

As the OK switch 113g is operated after the option "cancel" among the options listed in FIG. 12 is selected, the main CPU 108 brings up on display at the liquid crystal monitor 111 a menu screen such as that shown in FIG. 21. The main CPU 108 switches to a different option in response to a rotation operation signal output from the dial 113f. Then, as the OK switch 113g is operated, the main CPU 108 selects a specific internal setting determining whether or not to cancel setting details related to the photographing marks based upon the currently selected option.

If the option "yes" is selected, the main CPU 108 erases the setting details related to the photographing location marks having been set (altered) through the processing executed in the embodiment based upon the internal setting and invariably switches the photographing marks to the default mark (e.g., a regular circular mark). If the option "no" is selected, the main CPU 108 continues to hold the details of the settings related to the photographing location marks having been selected (altered) through the processing executed in the embodiment.

(Grouping)

Figure 22:
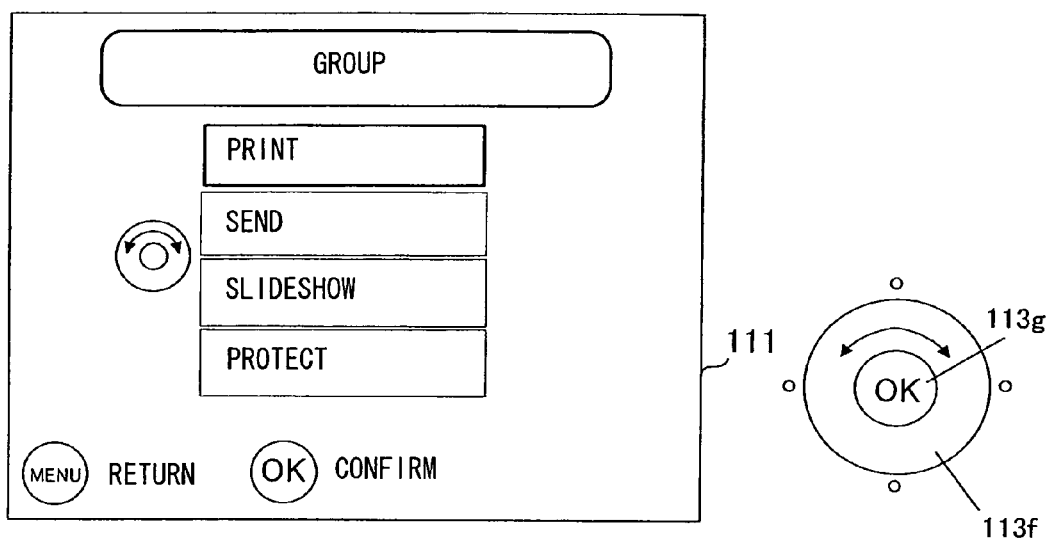
FIG. 22 presents an example of a menu screen.

The electronic camera 10 sorts images corresponding to specific photographing location marks displayed on the map image into groups. A plurality of images grouped together is designated as print target images, slideshow images or the like. FIG. 22 presents an example of a menu screen that may be displayed when selecting a specific setting for group of images. As the OK switch 113g is operated after the option "group" among the options listed in FIG. 11 is selected, the main CPU 108 brings up on display at the liquid crystal monitor 111 the menu screen shown in FIG. 22. Target images can be grouped together for each of the options in FIG. 22, i.e., "print", "send", "slideshow" and "protect". If "print" is selected, images to be printed out at an external printer are grouped together. As "send" is selected, images contained in image data files to be transmitted to an external device are grouped together. In addition, as "slideshow" is selected, images to be reproduced and displayed in sequence at the liquid crystal monitor 111 are grouped together. As "protect" is selected, images to be protected to ensure that the corresponding image data files are not erased from the recording medium 10A are grouped together.

(Print)

Figure 23:
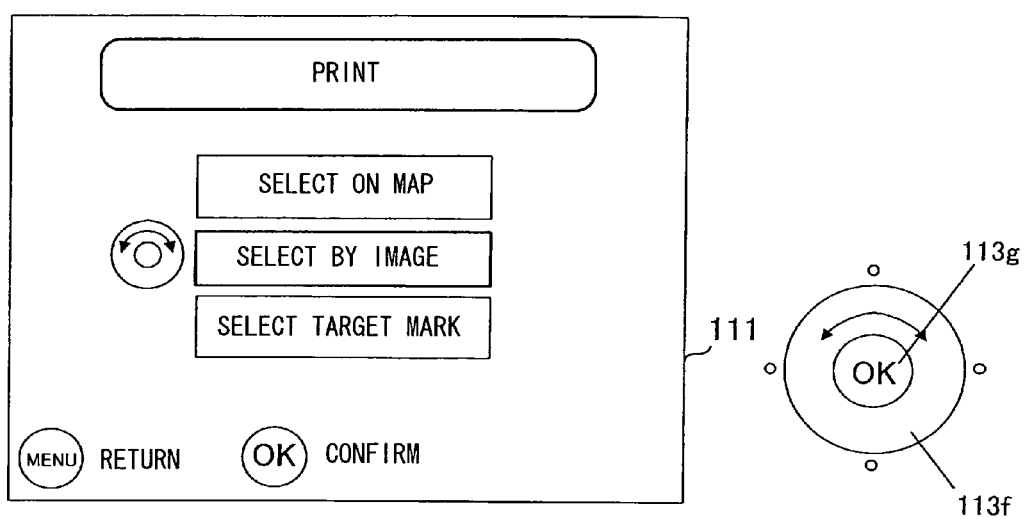
FIG. 23 presents an example of an operation screen.
Figure 24:
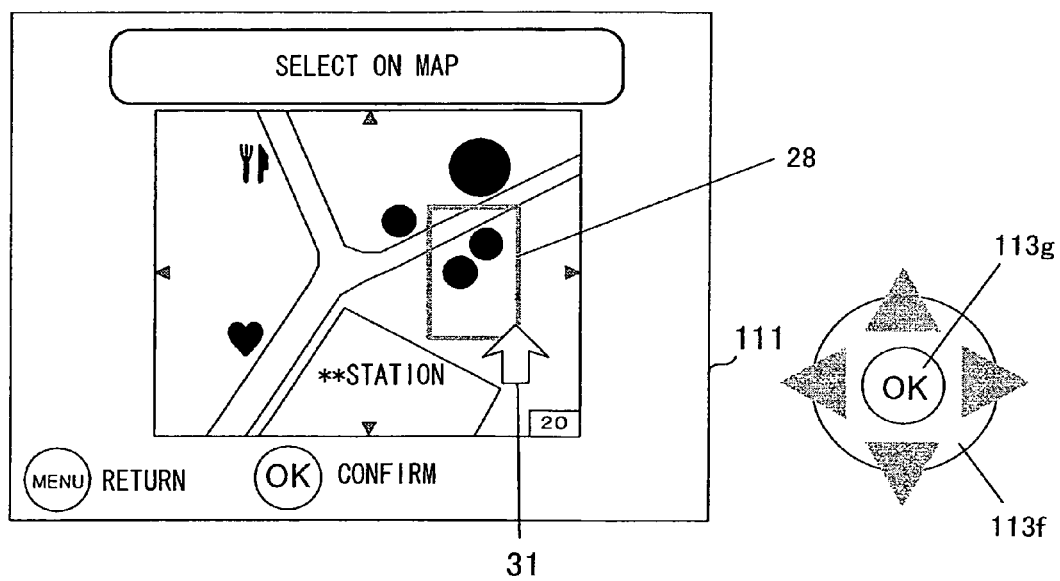
FIG. 24 presents an example of an operation screen.

FIG. 23 presents an example of an operation screen that may be brought up on display after the option "print" is selected. As the OK switch 113g is operated after the option "select on map" among the options listed in FIG. 23 is selected, the main CPU 108 brings up on display at the liquid crystal monitor 111 an operation screen such as that shown in FIG. 24. FIG. 24 shows an operation screen that may be displayed when selecting images to be grouped together on the map.

FIG. 24 shows an operation screen similar to that in FIG. 15, with photographing location marks displayed over a map image. Photographing location marks on display indicate the photographing locations where images among the image files recorded in the recording medium 10A were photographed within the area corresponding to the map range on display. The operation screen differs from that shown in FIG. 15 in that no photographing location mark list 27 is displayed. When selecting grouping target images "on map", the main CPU 108 designates all the images having been photographed at the photographing locations present within the current quadrangle 28 in a batch in response to an operation of the OK switch 113g.

Figure 25:
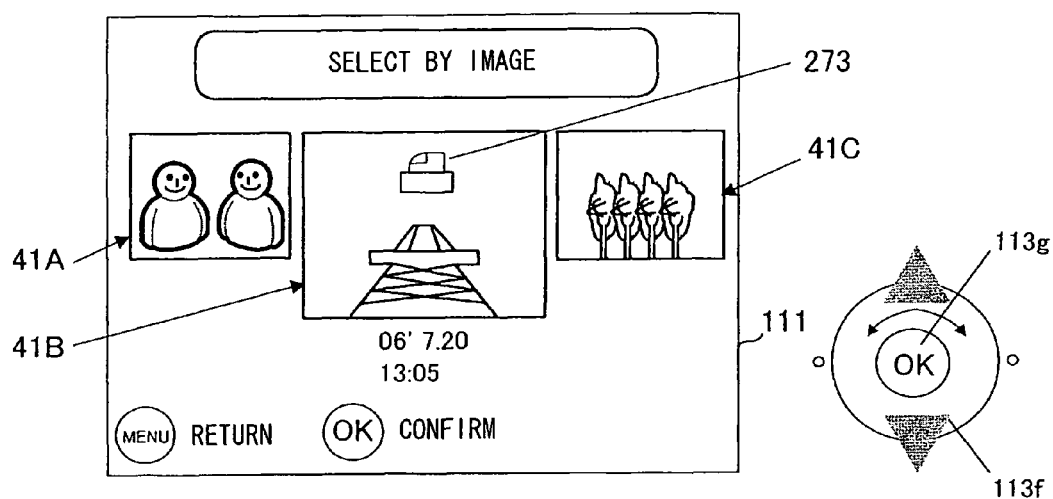
FIG. 25 presents an example of an operation screen.

As the OK switch 113g is operated after the option "select by image" among the options listed in FIG. 23 is selected, the main CPU 108 brings up on display at the liquid crystal monitor 111 an operation screen such as that shown in FIG. 25. In the operation screen shown in FIG. 25, which is similar to the operation screen shown in FIG. 14, thumbnail images 41A~41C of the images in image files recorded in the recording medium 10A are displayed side by side. However, the operation screen differs from that shown in FIG. 14 in that no photographing location mark list 27 is displayed.

When selecting grouping target images on an image-by-image basis, the main CPU 108 scrolls thumbnail images to the left/right in response to an rotation operation signal output from the dial 113f, as has been described in reference to FIG. 14. In addition, the main CPU 108 determines whether or not to display a print mark 273 in correspondence to the selected image (the thumbnail image 41B at the center in the example presented in FIG. 25) in response to an upward or downward operation signal input from the dial 113f. The print mark 273 displayed for the thumbnail 41B indicates that the image file corresponding to the thumbnail image 41B has been designated as a print target.

Figure 26:
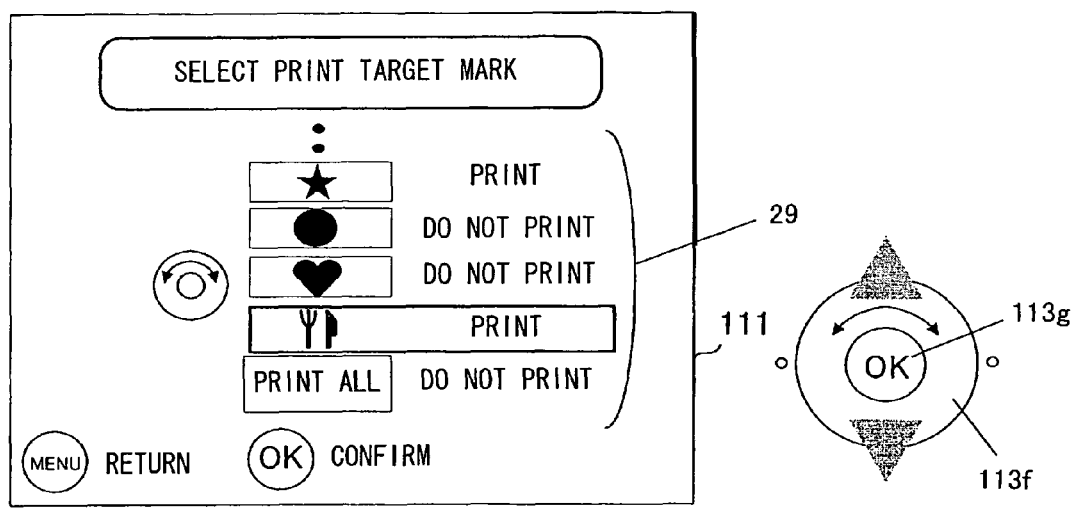
FIG. 26 presents an example of an operation screen.

As the OK switch 113g is operated after the option "select target mark" among the options listed in FIG. 23 is selected, the main CPU 108 brings up on display at the liquid crystal monitor 111 the operation screen shown in FIG. 26. FIG. 26 shows a mark list 29 listing a plurality of marks assuming different shapes or colors on display. The main CPU 108 selects a specific mark in the mark list 29 in response to a rotation operation signal output from the dial 113*f*. In addition, the main CPU 108 selects either "print" or "do not print" in correspondence to the selected mark based upon an upward or downward operation signal input from the dial 113*f*.

As the OK switch 113*g* is subsequently operated, the main CPU 108 designates all the marks in correspondence to which "print" has been selected as print target marks. In this case, the main CPU 108 designates in a batch the image files assigned with the photographing location marks matching the print target marks as print targets.

It is to be noted that the option "print all" is selected when selecting all the image files as print targets in a batch. As "print" is selected after the option "print all" in the mark list 29 is selected, the main CPU 108 designates all the image files as print targets in a batch regardless of the specific setting details of the individual photographing location marks. If "do not print" is selected after the option "print all" is selected in the mark list 29, no image file is designated as a print target regardless of the specific details of the settings corresponding to the individual photographing location marks.

As a print instruction is issued after specific print targets are set as described above, the main CPU 108 sequentially reads out the image files designated as the print targets from the recording medium 10A and transmits the data thus read out to the external printer (not shown).

When "slideshow" or "protect" is selected in the operation screen shown in FIG. 22, too, image files to be used for a slideshow or image files to be designated as protect targets can be set via operation screens and operation menus similar to those described in reference to the option "print".

(Send)

Figure 27:
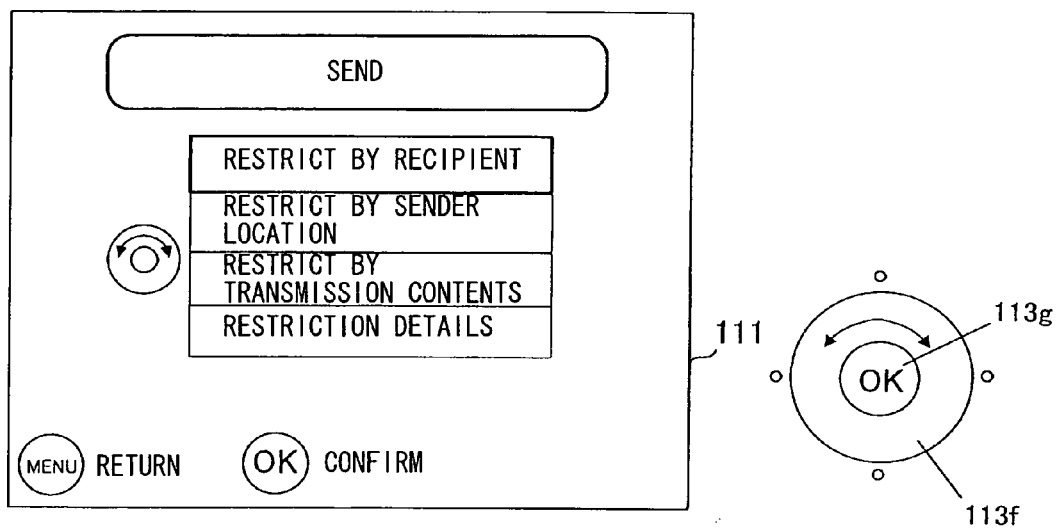
FIG. 27 presents an example of an operation screen.

FIG. 27 presents an example of an operation menu that may be brought up on display when selecting settings related to a send operation. As the OK switch 113*g* is operated after the option "send" among the options listed in FIG. 22 is selected, the main CPU 108 brings up on display at the liquid crystal monitor 111 the menu screen in FIG. 27. In addition, the main CPU 108 switches to a different option in response to a rotation operation signal output from the dial 113*f*. As the OK switch 113*g* is subsequently operated, the main CPU 108 displays a menu screen corresponding to the currently selected option at the liquid crystal monitor 111.

(Applying Restrictions in Correspondence to Recipient)

Figure 28:
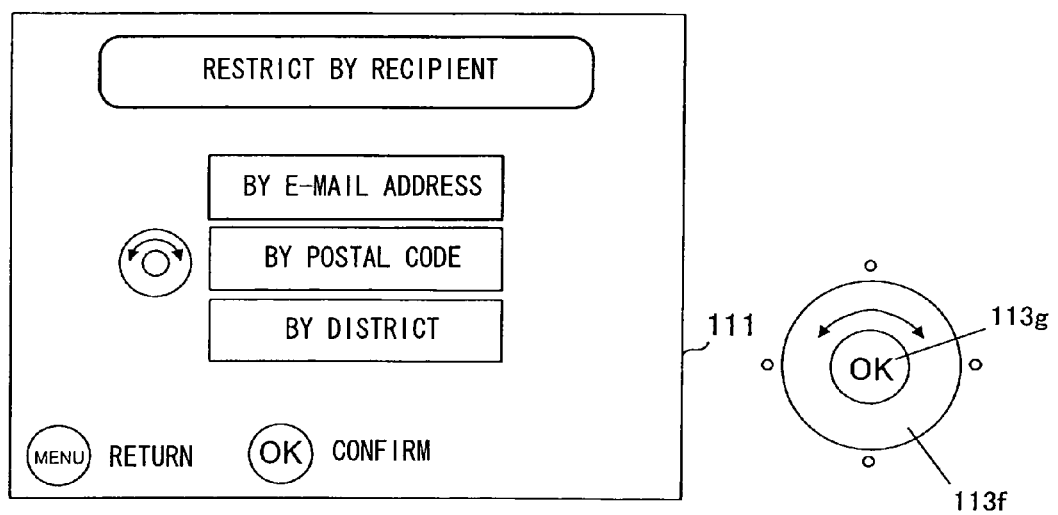
FIG. 28 presents an example of a menu screen.

The electronic camera 10 is capable of applying specific restrictions with respect to the transmission contents when it transmits image files to external devices. FIG. 28 presents an example of a menu screen in which a specific setting may be selected in order to apply restrictions in correspondence to individual recipients. As the OK switch 113*g* is operated after the option "restrict by recipient" among the options listed in FIG. 27 is selected, the main CPU 108 brings up on display at the liquid crystal monitor 111 a menu screen such as that shown in FIG. 28. A data list related to recipients (e.g., indicating the e-mail address, the street address and postal code of each recipient) is stored in advance in the non-volatile memory (not shown) in the electronic camera 10. If the setting details to be described later match a specific set of image file recipient information in the data list, the main CPU 108 applies restrictions with regard to the transmission contents in correspondence to the particular recipient.

Figure 29:
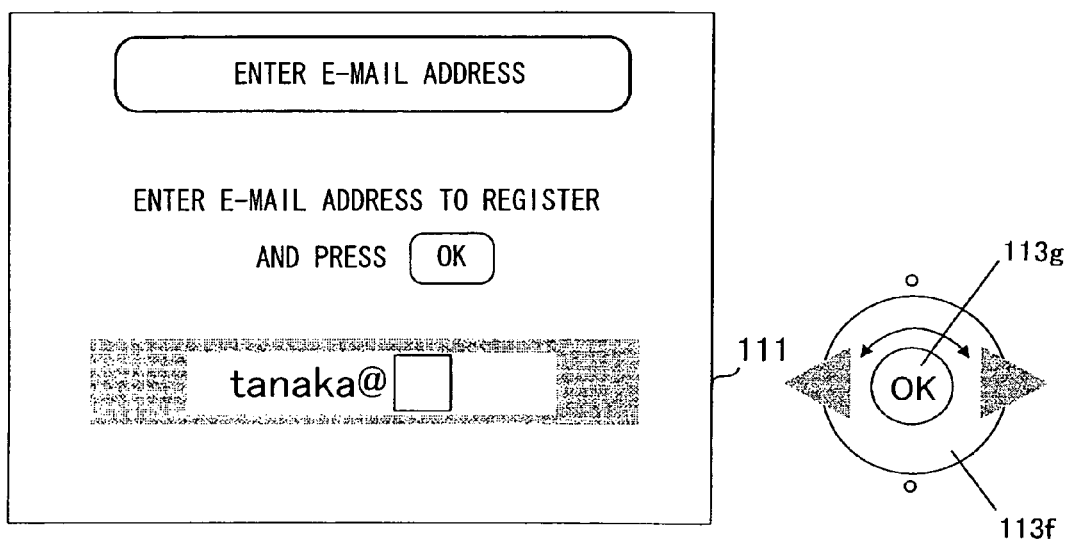
FIG. 29 presents an example of an operation screen.

FIG. 29 presents an example of an operation screen that may be displayed when setting an e-mail address. As the OK switch 113*g* is operated after the option "by e-mail address" among the options listed in FIG. 28 is selected, the main CPU 108 brings up on display at the liquid crystal monitor 111 the operation screen shown in FIG. 29.

The main CPU 108 selects a specific character or the like in response to a rotation operation signal provided from the dial 113*f* and moves the cursor position (indicated by the quadrangle in FIG. 29) to the right or the left in response to a rightward operation signal or a leftward operation signal input from the dial 113*f*. As the OK switch 113*g* is subsequently operated, the main CPU 108 registers the e-mail address having been entered into the non-volatile memory (not shown) as recipient information based upon which the transmission contents are to be restricted.

Figure 30:
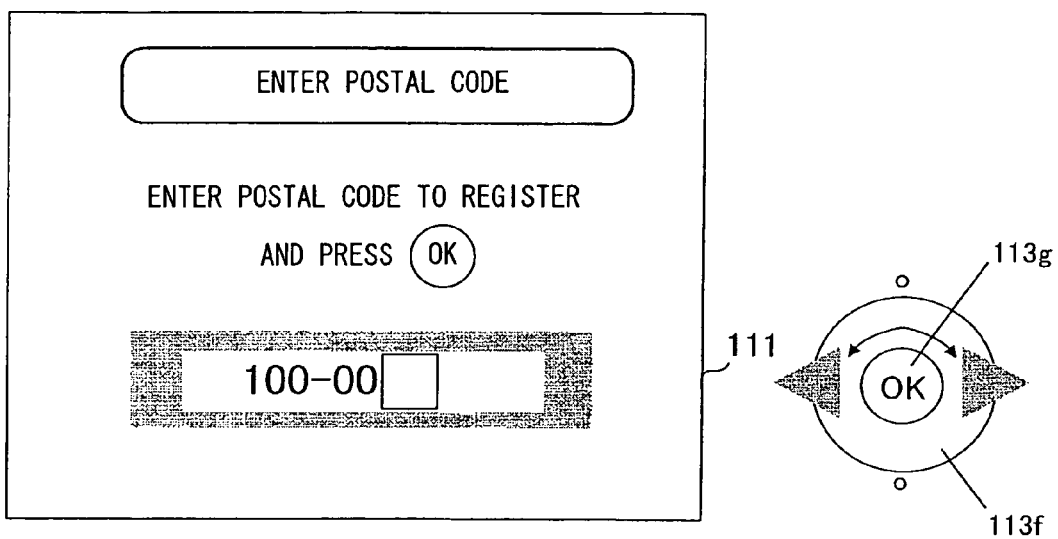
FIG. 30 presents an example of an operation screen.

FIG. 30 presents an example of an operation screen that may be displayed when setting a postal code. As the OK switch 113*g* is operated after the option "by postal code" among the options listed in FIG. 28 is selected, the main CPU 108 brings up on display at the liquid crystal monitor 111 the operation screen shown in FIG. 30.

The main CPU 108 selects a specific numeral in response to a rotation operation signal provided from the dial 113*f* and moves the cursor position (indicated by the quadrangle in FIG. 30 to the right or the left in response to a rightward operation signal or a leftward operation signal input from the dial 113*f*. As the OK switch 113*g* is subsequently operated, the main CPU 108 registers the postal code having been entered into the non-volatile memory (not shown) as recipient information based upon which the transmission contents are to be restricted.

Figure 31:
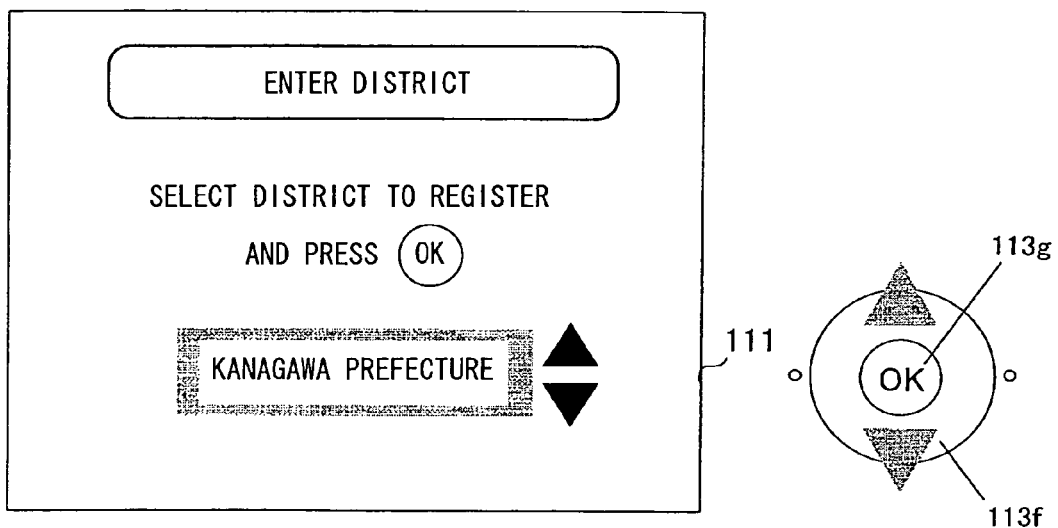
FIG. 31 presents an example of an operation screen.

FIG. 31 presents an example of an operation screen that may be displayed when setting a specific district. As the OK switch 113*g* is operated after the option "by district" among the options listed in FIG. 28 is selected, the main CPU 108 brings up on display at the liquid crystal monitor 111 the operation screen shown in FIG. 31.

The main CPU 108 displays a specific district in response to an upward operation signal or a downward operation signal input from the dial 113*f*. As the OK switch 113*g* is subsequently operated, the main CPU 108 registers the district currently on display into the non-volatile memory (not shown) as recipient information based upon which the transmission contents are to be restricted.

Figure 32:
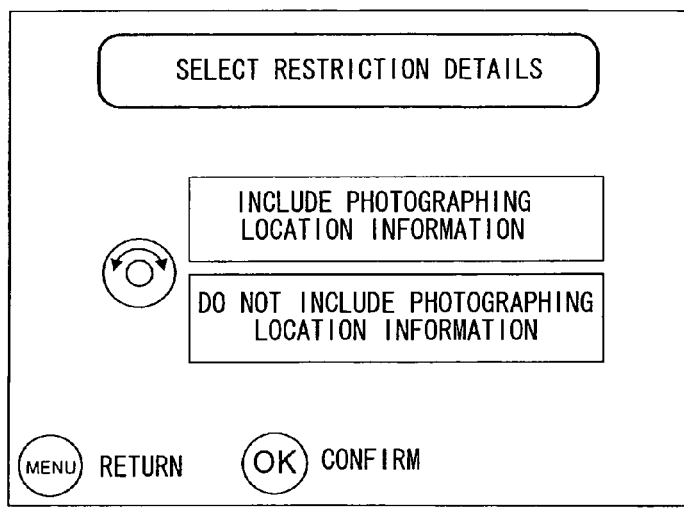
FIG. 32 presents an example of a menu screen.
Figure 32:
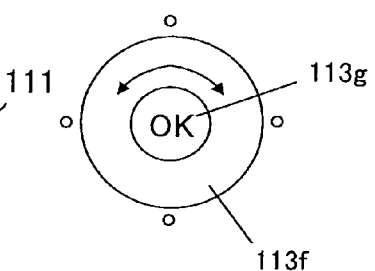

FIG. 32 presents an example of a menu screen in which a specific restriction detail setting may be selected. As the OK switch 113*g* is operated after the option "restriction details" among the options listed in FIG. 27 is selected, the main CPU 108 brings up on display at the liquid crystal monitor 111 the menu screen shown in FIG. 32.

The main CPU 108 switches to a different option in response to a rotation operation signal provided from the dial 113*f*. Then, as the OK switch 113*g* is operated, the CPU 108 selects an internal setting indicating specific restriction details in correspondence to the currently selected option. If "include photographing location information" is selected, the main CPU 108 allows transmission of image files containing the additional information (including the position information and the mark information) described earlier based upon the internal setting. If the option "do not include photographing location information" is selected, the main CPU does not allow transmission of the image files containing the additional information (including the position information and the mark information) described earlier. In the latter case, transmission contents are restricted by transmitting the image files after first deleting at least the position information in the additional information.

(Applying Restrictions by Sender Location)

Figure 33:
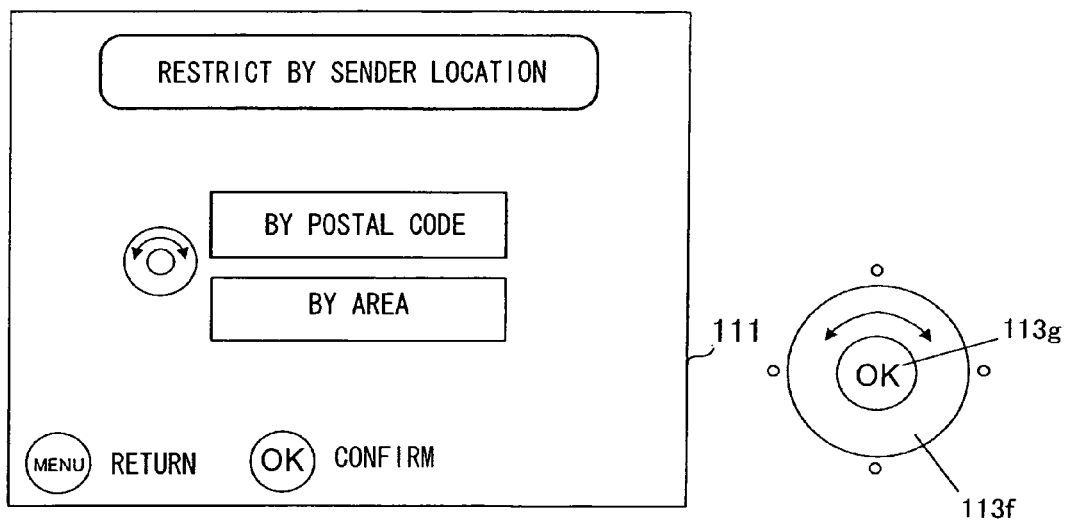
FIG. 33 presents an example of a menu screen.

The electronic camera 10 is also capable of applying restrictions on the transmission contents in correspondence to the sender location when transmitting image files to an external device. FIG. 33 presents an example of a menu screen in which a specific setting may be selected in order to apply restrictions in correspondence to the sender location. As the OK switch 113g is operated after the option "restrict by sender location" among the options listed in FIG. 27 is selected, the main CPU 108 brings up on display at the liquid crystal monitor 111 a menu screen such as that shown in FIG. 33.

The main CPU 108 restricts the transmission contents if the setting details to be detailed later match the current position information. The current position information indicates the current position of the electronic camera 10. As the OK switch 113g is operated after the option "by postal code" among the options listed in FIG. 33 is selected, the main CPU 108 displays an operation screen similar to that shown in FIG. 30 at the liquid crystal monitor 111. The postal code can be entered through the procedure described in reference to FIG. 30.

The main CPU 108 registers the postal code currently on display into the non-volatile memory (not shown) as sender location information based upon which the transmission contents are to be restricted. If the current position of the electronic camera 10 is within an area corresponding to the postal code registered in the non-volatile memory (not shown), the main CPU 108 determines whether or not to "include photographing location information" based upon the setting selected with regard to the "restriction details" explained earlier (see FIG. 32).

As the OK switch 113g is operated after the option "by district" among the options listed in FIG. 33 is selected, the main CPU 108 displays an operation screen similar to that shown in FIG. 31 at the liquid crystal monitor 111. The district can be entered through the procedure described in reference to FIG. 31.

The main CPU 108 registers the district currently on display in the non-volatile memory (not shown) as sender location information based upon which the transmission contents are to be restricted. If the current position of the electronic camera 10 is within the area corresponding to the district registered in the non-volatile memory (not shown), the main CPU 108 determines whether or not to "include photographing location information" based upon the setting selected with regard to the "restriction details" explained earlier (see FIG. 32).

(Applying Restrictions by Transmission Contents)

Figure 34:
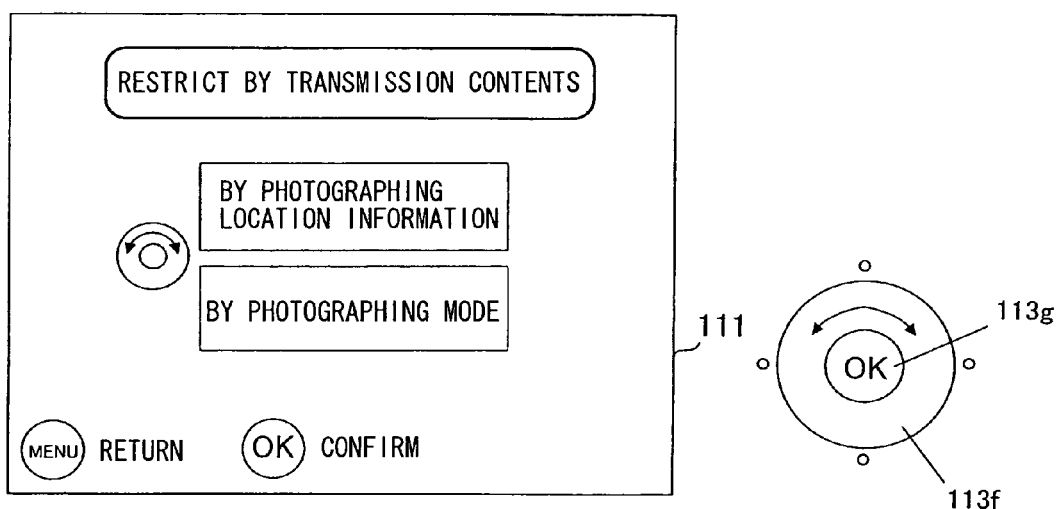
FIG. 34 presents an example of a menu screen.

The electronic camera 10 is also capable of applying restrictions on the transmission contents in correspondence to the contents of transmission target image files when transmitting image files to an external device. FIG. 34 presents an example of a menu screen in which a specific setting may be selected in order to apply restrictions in correspondence to the transmission contents. As the OK switch 113g is operated after the option "restrict by transmission contents" among the options listed in FIG. 27 is selected, the main CPU 108 brings up on display at the liquid crystal monitor 111 a menu screen such as that shown in FIG. 34.

Figure 35:
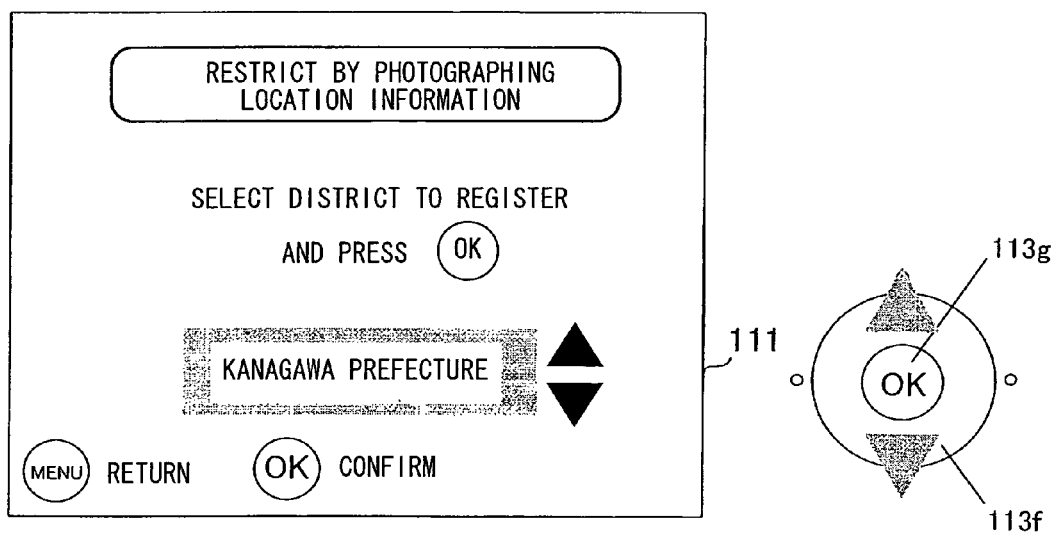
FIG. 35 presents an example of an operation screen.

The main CPU 108 restricts the transmission contents for a given transmission target image file if the setting details to be detailed later match the position information or the photographing mode information indicating the photographing mode assumed for the photographing operation, contained in the transmission target image file. As the OK switch 113g is operated after the option "by photographing location information" among the options listed in FIG. 34 is selected, the main CPU 108 displays an operation screen such as that shown in FIG. 35 at the liquid crystal monitor 111. A specific district can be entered and registered into the non-volatile memory (not shown) through a procedure similar to that described in reference to FIG. 31.

If the position information in the transmission target image file matches the district registered in the non-volatile memory (not shown), the main CPU 108 determines whether or not to "include photographing location information" in the transmission contents, based upon the setting selected as the "restriction details", as described earlier (see FIG. 32).

Figure 36:
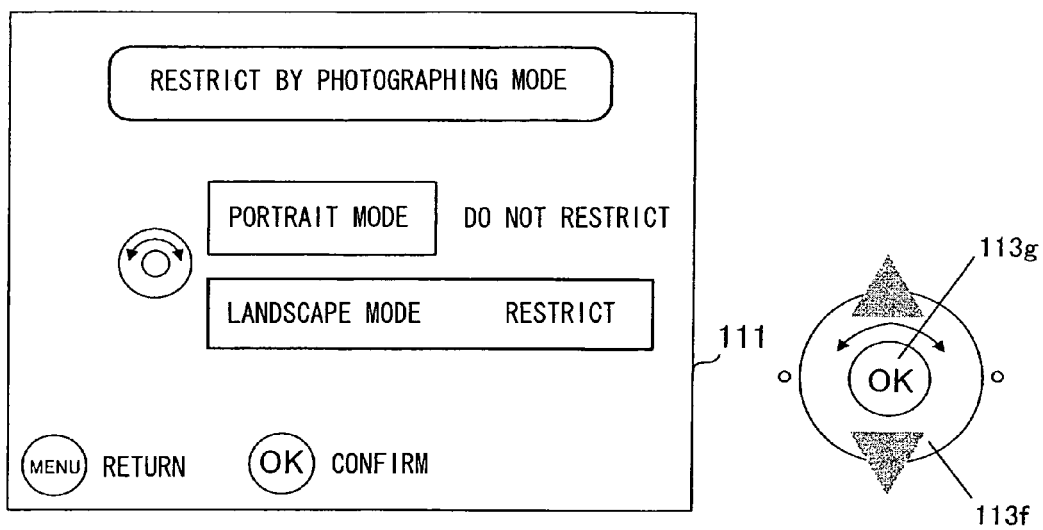
FIG. 36 presents an example of an operation screen.

As the OK switch 113g is operated after the option "by photographing mode" among the options listed in FIG. 34 is selected, the main CPU 108 brings upon display at the liquid crystal monitor 111 an operation screen such as that shown in FIG. 36. The main CPU 108 selects either "portrait mode" or "landscape mode" in response to a rotation operation signal provided from the dial 113f. In addition, the main CPU 108 selects either "restrict" or "do not restrict" for the selected photographing mode in response to an upward operation signal or a downward operation signal input thereto from the dial 113f.

As the OK switch 113g is operated, the main CPU 108 designates image files containing images having been photographed in the photographing mode in correspondence to which the option "restrict" has been selected, as restriction target image files. At the same time, image files containing images having been photographed in a photographing mode for which "do not restrict" has been selected, are exempted from the restrictions. The main CPU 108 checks the photographing mode set when the image in each transmission target image file was photographed and determines based upon the "restrict"/"do not restrict" option selected in correspondence to the photographing mode as to whether to transmit the image file containing the position information or transmit the image file without the position information.

The following advantages are achieved through the embodiment described above.

(1) Any photographing location mark selected and set (in step S64) or automatically selected after making a negative decision in step S63 (FIG. 6) in the photographing mode (see FIG. 6) can be altered later through a menu operation. This allows the user to concentrate on his photography without having to worry about selecting photographing location mark at the time of the photographing operation.

(2) A photographing location mark setting can be adjusted to select a different type of mark in correspondence to each image (see FIG. 14) and thus, the user is able to select the optimal photographing location mark by checking the photographic image.

(3) A photographing location mark setting can be adjusted by selecting a different type of mark on the map (see FIG. 15) and thus, the user is able to select the optimal photographing location mark by checking the photographing location on the map.

(4) Photographing location mark settings can be selectively adjusted on the map by specifically targeting the photographing location marks within the frame 28. Thus, a plurality of photographing location mark settings can be adjusted in a batch with ease.

(5) The user can choose not to display a photographing location by selecting the option "no mark". Thus, no photographing location mark is displayed on the map in correspondence to any photographing location the user does not wish to disclose.

(6) A common photographing location mark can be selected for all the images in a batch (see FIG. 16), affording a high level of convenience when the user wishes to indicate the photographing locations of all the images with a single type of mark.

(7) A specific length of time limit can be set over which the photographing location mark setting details remain effective, affording a high level of convenience for users wishing to set a limited effective period for the current settings.

(8) By switching the photographing location mark display, either a display of the photographing location marks resulting from setting adjustment (with no mark displayed for a photographing location for which "no mark" has been selected) or a display with all the photographing location marks (with the default mark displayed for a photographing location for which "no mark" has been selected) can be brought up.

(9) Since a photographing location can be indicated by a directional mark, the user is able to ascertain the photographing direction along which the image was photographed at the particular photographing location.

(10) Since the directional mark is used to indicate the photographing location only when the scale of the map on display is greater than a predetermined value, it is ensured that the direction is indicated in a state in which the subject, such as a building, is visible on the map.

(Variation 12)

When selecting types of marks on the map, the settings for the photographing location marks outside the frame 28 may be selectively selected/adjusted instead of selecting/adjusting the photographing location marks within the frame 28. In addition, options "set inside frame 28" and "set outside frame 28" may be made available.

(Fourth Embodiment)

The fourth embodiment of the present invention is now described. The following explanation focuses on the difference from the first through third embodiments, with the same reference numerals assigned to components identical to those in the first through third embodiments, to preclude the necessity for a repeated explanation. In other words, unless a given component is particularly noted, it is identical to the corresponding component in the first through third embodiments. The embodiment allows a map image to be displayed in the photographing mode (see FIG. 6) as well.

At the electronic camera 10 achieved in the embodiment, either a map image to be used in the photographing mode or a map image of an area to be used in the reproduction mode can be selected. When the electronic camera 10 is set in the photographing mode, a map image around the current position of the electronic camera 10 (the position determined through arithmetic operation executed based upon the reception signal provided from the GPS device 114) and a photographing location mark (corresponding to the current position), superimposed over the map image, are displayed at the liquid crystal monitor 111 in a step which may be executed, for instance, between step S65 and step S66. It is desirable that the most up-to-date map information (map data) be obtained from an external device (a personal computer or the like) via the wireless interface 116 or the external interface 112 and be used to display the map image. The use of the most up-to-date map information ensures that the photographing location mark is not displayed on an out-of-date map.

However, it is desirable to display a map image (after making an affirmative decision in step S11) that contains the position determined at the time of the photographing operation (i.e., the photographing location at which the image in the image file recorded in the recording medium 10A was photographed) in the reproduction mode (see FIG. 5) by using map information created on a date closest to the image photographing date and preceding the photographing date. The use of the map information created around the photographing date ensures that the photographing location mark is not displayed over the wrong version of the map. It is to be noted that if map information that may be used to display the map image in the version corresponding to the photographing date is not recorded in the recording medium 10A, such map information should be obtained from an external device via the wireless interface 116 or the external interface 112.

It is desirable that when displaying on the map image a plurality of photographing location marks indicating a plurality of photographing locations at which images were photographed on different photographing dates, map information having been created on a date closest to the most recent photographing date among the plurality of image photographing dates and preceding the particular photographing date be used.

It is also desirable that when displaying a plurality of photographing location marks on the map image, the optimal scale to be assumed in conjunction with the map information be determined so as to ensure that the photographing marks are displayed in correspondence to all the images recorded in a specific folder in the recording medium 10A within the display range at the liquid crystal monitor 111. The map information assuming the scale thus determined may be obtained from an external device. Through these measures, photographing location marks can be displayed on the map image in correspondence to all the images.

However, if the scaling factor determined as described earlier is equal to or less than the predetermined value, map information assuming a scale greater than the predetermined value should be obtained from the external device in a plurality of installments. Under such circumstances, the plurality of photographing location marks will be displayed over a plurality of map images. Generally speaking, better user convenience is afforded by displaying photographing location marks on a map with a large scaling factor, in which details such as buildings can be recognized, rather than by displaying photographing location marks on a wide-area map with a small scaling factor, since the user is likely to be able to remember exactly what he photographed at a specific photographing location by identifying a building or the like present at the photographing location.

The embodiments described above are simply provided as examples and components other than those in the embodiments may be used as long as the features characterizing the present invention are not compromised. In addition, the first through fourth embodiments and variations 1 through 12 in reference to which the present invention has been described may be adopted in any combination thereof.

What is claimed is:

1. An electronic apparatus, comprising:
   a display at which a photographic image and a map image are displayed;
   a display control unit that controls the display so as to display identifiers each indicating a specific photographing location at which the photographic image among a plurality of photographic images was captured, over the map image displayed at the display;
   a specification unit that receives a selecting operation for selecting a part of the map image from an entire area of the map image that is being displayed at the display and specifies the selected part of the map image as a specified region; and
   an instruction unit that issues an instruction to change a common appearance of identifiers in the specified region specified by the specification unit, wherein
   the display control unit controls the display so as to change the appearance of all the common identifiers in the specified region in accordance with the instruction issued by the instruction unit.

2. An electronic apparatus according to claim 1, wherein:
the instruction unit issues the instruction indicating the appearance of the identifier in correspondence to a photographing date on which the photographic image was captured.

3. An electronic apparatus according to claim 1, wherein:
the instruction unit issues the instruction indicating the appearance of the identifier in correspondence to device information indicating a device used to capture the photographic image.

4. An electronic apparatus according to claim 1, wherein:
the instruction unit issues the instruction indicating the appearance of the identifier in correspondence to an operation signal output from an operation member.

5. An electronic apparatus according to claim 4, wherein:
the instruction unit issues the instruction indicating the appearance of the identifier in correspondence to the operation signal output from the operation member while the map image is displayed at the display.

6. An electronic apparatus according to claim 4, wherein:
the instruction unit issues the instruction indicating the appearance of the identifier in correspondence to the operation signal output from the operation member while the photographic image is displayed at the display.

7. An electronic apparatus according to claim 2, wherein:
the instruction unit selects one of an option for setting the common appearance of the identifiers in correspondence to all photographing locations and an option for not displaying the identifiers at any of the photographing locations.

8. An electronic apparatus according to claim 2, wherein:
when a plurality of the identifiers are displayed over the map image, the instruction unit selects displaying all of the identifiers over the map image or displaying only specific identifiers over the map image.

9. An electronic apparatus according to claim 4, wherein:
the instruction unit sustains the appearance of the identifier over a specific length of time.

10. An electronic apparatus according to claim 9, wherein:
the instruction unit adjusts the specific length of time based upon the operation signal output from the operation member.

11. An electronic apparatus according to claim 1, wherein:
the identifiers assume an appearance that allows the identifiers to indicate photographing directions; and
the instruction unit determines orientations of the identifiers in correspondence to the photographing directions in which photographs were taken at the photographing locations.

12. An electronic apparatus according to claim 11, wherein:
when the map image is displayed at the display with a display scale equal to or greater than a predetermined value, the instruction unit allows use of the identifiers assuming the appearance that enables the identifiers to indicate the photographing directions.

13. An electronic apparatus according to claim 8, wherein:
the instruction unit specifies the identifiers corresponding to indicated photographing locations.

14. An electronic apparatus according to claim 8, wherein:
the instruction unit specifies the identifiers corresponding to not indicated photographing locations.

15. An electronic apparatus according to claim 1, wherein the selecting operation is executed by assuming a quadrangle on the map image that is being displayed at the display.

16. An electronic apparatus according to claim 1, wherein the appearance is a shape of the identifier.

17. An electronic apparatus according to claim 1, wherein the appearance is a color of the identifier.

* * * * *